US011417267B2

(12) United States Patent
Choi et al.

(10) Patent No.: US 11,417,267 B2
(45) Date of Patent: Aug. 16, 2022

(54) ELECTRONIC DEVICE FOR CONTROLLING DISPLAY OF CONTENT ON BASIS OF BRIGHTNESS INFORMATION AND OPERATION METHOD THEREFOR

(71) Applicant: Samsung Electronics Co., Ltd., Gyeonggi-do (KR)

(72) Inventors: Seungkyu Choi, Gyeonggi-do (KR); Matheus Farias Miranda, Gyeonggi-do (KR); Hanyuool Kim, Gyeonggi-do (KR); Taewoong Lee, Gyeonggi-do (KR); Dongkyoon Han, Gyeonggi-do (KR); Kwangtai Kim, Gyeonggi-do (KR); Hyungsup Byeon, Gyeonggi-do (KR); Donghyun Yeom, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 16/968,185

(22) PCT Filed: Feb. 1, 2019

(86) PCT No.: PCT/KR2019/001463

§ 371 (c)(1),
(2) Date: Aug. 7, 2020

(87) PCT Pub. No.: WO2019/156454

PCT Pub. Date: Aug. 15, 2019

(65) Prior Publication Data

US 2021/0366367 A1 Nov. 25, 2021

(30) Foreign Application Priority Data

Feb. 7, 2018 (KR) ........................ 10-2018-0015052

(51) Int. Cl.
*G09G 3/32* (2016.01)
*H04N 1/60* (2006.01)
(Continued)

(52) U.S. Cl.
CPC ....... *G09G 3/32* (2013.01); *G09G 2320/0257* (2013.01); *G09G 2320/043* (2013.01);
(Continued)

(58) Field of Classification Search
CPC combination set(s) only.
See application file for complete search history.

(56) References Cited

U.S. PATENT DOCUMENTS

2006/0139706 A1* 6/2006 Kotani ..................... G09G 5/02
358/518
2014/0301638 A1 10/2014 Kim et al.
(Continued)

FOREIGN PATENT DOCUMENTS

KR 10-2005-0120343 A 12/2005
KR 10-1068653 B1 9/2011
(Continued)

*Primary Examiner* — Wesner Sajous
(74) *Attorney, Agent, or Firm* — Cha & Reiter, LLC

(57) ABSTRACT

Various embodiments of the present invention relate to an electronic device for adjusting voltage and an operation method therefor. The electronic device may comprise: a display; and a processor, wherein the processor is configured to: identify first information which relates to the brightness of at least one first content included in a first image layer and is to be displayed using the display, and second information which relates to the brightness of at least one second content included in a second image layer and is to be displayed using the display; adjust the brightness of the second content at least on the basis of a difference between the first information and the second information; and in a state where the second image layer is superimposed on the first image layer including the first content, display the at least one first content, and the second content the brightness of which has been adjusted, using the display. Other embodiments are also possible.

10 Claims, 21 Drawing Sheets

301

(51) Int. Cl.
*H04N 5/57* (2006.01)
*H04N 9/69* (2006.01)
*H04N 9/77* (2006.01)

(52) U.S. Cl.
CPC ............... *G09G 2320/0626* (2013.01); *G09G 2320/0666* (2013.01); *G09G 2320/0686* (2013.01); *G09G 2320/103* (2013.01); *G09G 2360/147* (2013.01)

(56) References Cited

U.S. PATENT DOCUMENTS

| | | | | |
|---|---|---|---|---|
| 2014/0362105 | A1* | 12/2014 | Kocienda | G06F 9/451 345/600 |
| 2015/0042697 | A1 | 2/2015 | Park et al. | |
| 2015/0097879 | A1* | 4/2015 | Reeves | G09G 5/02 345/694 |
| 2016/0063917 | A1 | 3/2016 | Kondo | |
| 2016/0291858 | A1 | 10/2016 | Kocienda et al. | |
| 2016/0360167 | A1* | 12/2016 | Mitchell | H04N 9/3194 |
| 2017/0309216 | A1 | 10/2017 | Jiao et al. | |
| 2018/0167558 | A1* | 6/2018 | Hirai | G03B 13/12 |
| 2018/0330697 | A1* | 11/2018 | Lee | G09G 5/363 |
| 2019/0052939 | A1* | 2/2019 | Wang | H04L 9/3236 |

FOREIGN PATENT DOCUMENTS

| | | | |
|---|---|---|---|
| KR | 10-1178472 | B1 | 9/2012 |
| KR | 10-2014-0143698 | A | 12/2014 |
| KR | 10-2015-0018966 | A | 2/2015 |
| KR | 10-1516963 | B1 | 5/2015 |
| KR | 10-2016-0033605 | A | 3/2016 |
| KR | 10-2017-0091763 | A | 8/2017 |
| WO | 2014/203438 | A1 | 12/2014 |

* cited by examiner

ELECTRONIC DEVICE FOR CONTROLLING DISPLAY OF CONTENT ON BASIS OF BRIGHTNESS INFORMATION AND OPERATION METHOD THEREFOR

CROSS-REFERENCE TO RELATED APPLICATION(S)

This application is a National Phase Entry of PCT International Application No. PCT/KR2019/001463, which was filed on Feb. 1, 2019, and claims priority to Korean Patent Application No. 10-2018-0015052, which was filed on Feb. 7, 2018, the contents of which are incorporated herein by reference.

TECHNICAL FIELD

The disclosure relates to an electronic device for controlling display of content and a method of operating the same.

BACKGROUND ART

With the development of digital technology, various electronic devices including displays (or display devices) have been distributed. The display may include a plurality of pixels. Each of the plurality of pixels may include light emitting elements such as Light Emitting Diodes (LEDs) or Organic Light Emitting Diodes (OLEDs). The electronic device may display at least one content through at least one light emitting element included in the display.

DISCLOSURE OF INVENTION

Technical Problem

In order to display content on a display, an electronic device may use only some of a plurality of light-emitting elements included in the display. For example, the electronic device may perform control to emit some light-emitting elements by activating the same on the basis of a display attribute for each pixel corresponding to at least one content and perform control not to emit other light-emitting elements by deactivating the same. The performance of light-emitting elements may deteriorate according to an increase in a light-emitting time (or a use time). Accordingly, due to a difference in the light-emitting time of the light-emitting elements in the electronic device, the performance of the light-emitting elements may be different. When the performance of the light-emitting elements included in the display of the electronic device is different, an afterimage may appear on the display.

Therefore, various embodiments of the disclosure disclose a method and an apparatus for controlling display attributes of at least one content in order to prevent a performance difference between a plurality of light-emitting elements included in the display of the electronic device.

Solution to Problem

In accordance with an aspect of the disclosure, an electronic device is provided. The electronic device includes: a display; and a processor, wherein the processor is configured to identify first information related to a brightness of at least one first content included in a first image layer to be displayed on the display and second information related to a brightness of at least one second content included in a second image layer to be displayed on the display, control the brightness of the second image layer, based on at least a difference between the first information and the second information, and display the at least one first content and the second content of which the brightness is controlled on the display in a state in which the second image layer is overlaid on the first image layer including the first content.

In accordance with another aspect of the disclosure, an electronic device is provided. The electronic device includes: a display; and a processor, wherein the processor is configured to identify first information related to a brightness of a first image layer including at least one first content to be displayed on the display and second information related to a brightness of a second image layer including at least one second content to be displayed on the display, control the brightness of the second image layer, based on at least a difference between the first information and the second information, and display the at least one first content and the at last one second content on the display in a state in which the second image layer of which the brightness is controlled is overlaid on the first image layer.

In accordance with another aspect of the disclosure, an electronic device is provided. The electronic device includes: a display; and a processor, wherein the processor is configured to determine first display attribute information related to a first image layer including at least one first content to be displayed on the display, determine second display attribute information related to a second image layer including at least one second content to be displayed on the display, based on the first display attribute information, and display the first image layer and the second image layer based on the determined second display attribute information on the display.

Advantageous Effects of Invention

According to various embodiments of the disclosure, it is possible to prevent a performance difference between a plurality of light-emitting elements included in a display and thus prevent appearance of an after image on the display as an electronic device controls display attributes of at least one content on the basis of brightness information. Further, it is possible to provide visual stability to a user as the electronic device controls display attributes of at least one content.

BEST MODE FOR CARRYING OUT THE INVENTION

Figure 1:
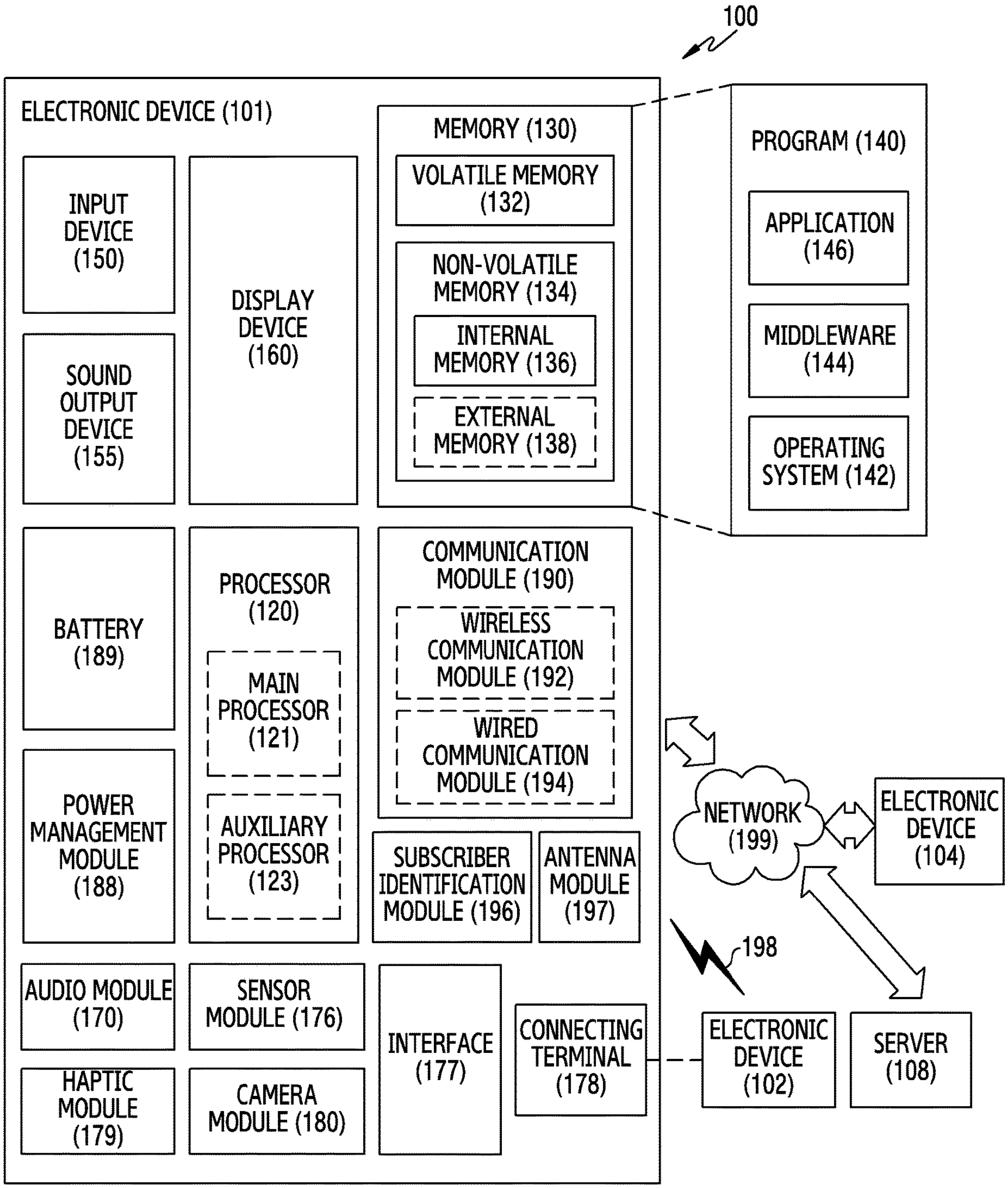
FIG. 1 is a block diagram of an electronic device 101 for controlling a display of content within a network environment 100 on the basis of brightness information according to various embodiments.

Hereinafter, various embodiments of the present disclosure are disclosed with reference to the accompanying drawings. It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

FIG. 1 is a block diagram of an electronic device 101 for controlling a display of content within a network environment 100 on the basis of brightness information according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
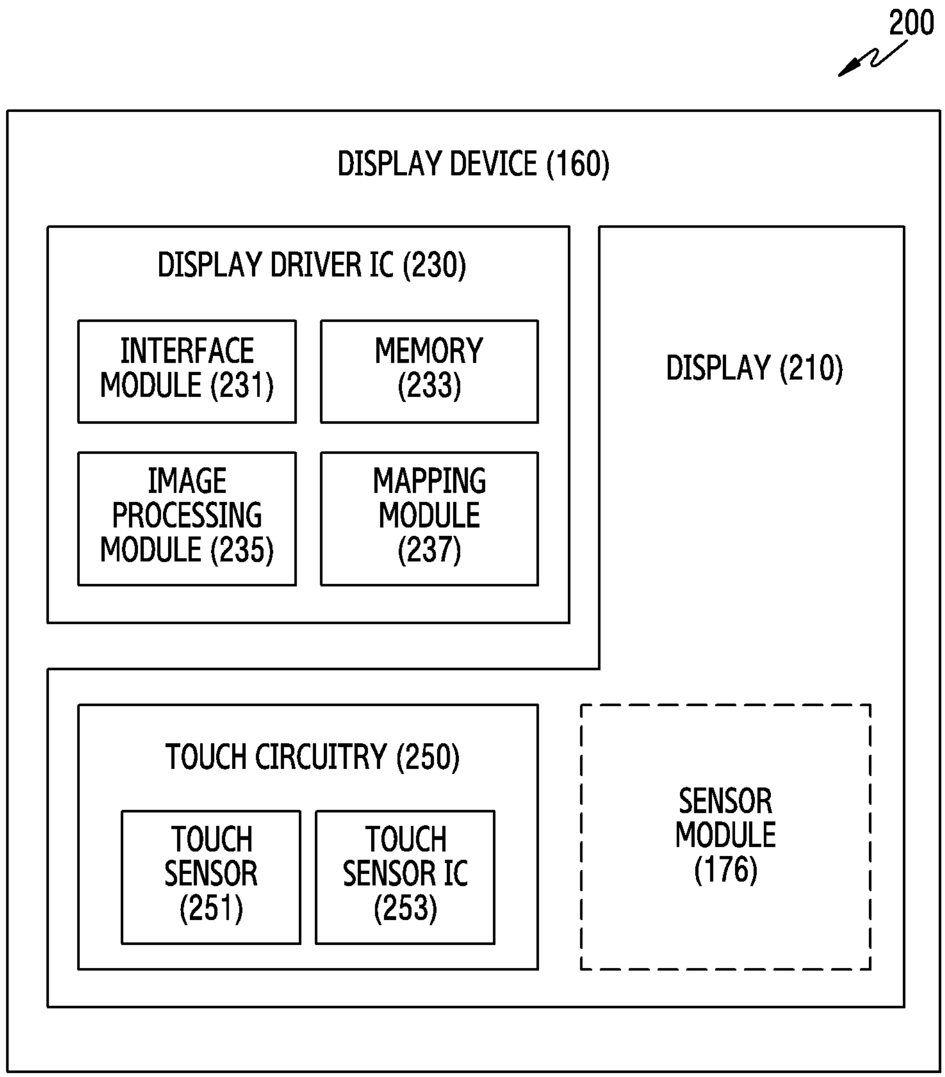
FIG. 2 is a block diagram 200 of a display device 160 for controlling a display of content on the basis of brightness information according to various embodiments.

FIG. 2 is a block diagram 200 of a display device 160 for controlling a display of content on the basis of brightness information according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

According to various embodiments, the processor 120 may control the display device 160 to display a plurality of image layers on the display 210. According to an embodiment, at least one first content included in a first image layer among the plurality of image layers may be determined and/or changed by at least one application being executed. For example, when a video application is being executed by the electronic device 101, at least one first content included in the first image layer may include video-related content. In another example, when a message application is being executed by the electronic device 101, at least one first content included in the first image layer may include message-related content. According to an embodiment, at least one second content included in a second image layer among the plurality of image layers may include fixed content that is not changed by at least one application being executed. For example, at least one second content included in the second image layer may include content including at least one icon (or symbol) indicating a preset menu item (for example, viewing a recent usage history, a home screen shortcut, or return). However, various embodiments of the disclosure are not limited thereto. For example, at least one second content included in the second image layer may be changed by at least one application being executed. According to an embodiment, display regions of the plurality of respective image layers may be different or at least some thereof may overlap. For example, among the plurality of image layers, the first image layer may be displayed in a part of the entire regions of the display 210, and the second image layer may be displayed in another part that does not overlap the part in which the first image layer is displayed. In another example, among the plurality of image layers, the first image layer may be displayed in the entire regions of the display 210 and the second image layer may be displayed in a part of the entire regions. For example, the second image layer may be displayed while partially overlapping the first image layer on the first image layer. Display regions of the first image layer and the second image layer may be changed by an application being executed or user input.

According to various embodiments, the processor 120 may acquire first display attribute information related to the first image layer among the plurality of image layers.

According to an embodiment, the first display attribute information related to the first image layer may include first brightness information and/or first color information acquired from at least one first content included in the first image layer. For example, the processor 120 may acquire brightness values of a plurality of pixels on the basis of at least one first content included in the first image layer and determine first brightness information on the basis of the acquired brightness values. In another example, the processor 120 may acquire color values of a plurality of pixels on the basis of at least one first content included in the first image layer and determine first color information on the basis of the acquired color values.

According to various embodiments, the processor 120 may configure at least a partial region of the first image layer as a region of interest and acquire first display attribute information within the region of interest of the first image layer. The region of interest may be configured as, for example, the entire regions of the first image layer or at least a partial region adjacent to the second image layer among the entire regions of the first image layer. According to an embodiment, the processor 120 may configure and/or change the region of interest on the basis of a type and/or a characteristic of an application being executed. According to an embodiment, the processor 120 may configure and/or change the region of interest on the basis of user input. According to an embodiment, the processor 120 may configure a plurality of candidate regions of interest and determine one of the plurality of candidate regions of interest as the region of interest based on display attribute information of content included in at least one candidate region of interest among the plurality of candidate regions of interest. For example, the processor 120 may configure a partial area of the first image layer adjacent to the second image layer as a first candidate region of interest and configure the entire region of the first image layer as a second candidate region of interest. The processor 120 may acquire display attribute information of content included in the first candidate region of interest and determine one of the first candidate region of interest and the second candidate region of interest as the region of interest on the basis of whether the acquired display attribute information satisfies a predetermined condition. For example, the processor 120 may acquire color information from content included in the first candidate region of interest of the first image layer and determine whether the first candidate region of interest is configured with a single color on the basis of the acquired color information. When the first candidate region of interest is configured with a single color, the processor 120 may determine the first candidate region of interest as the region of interest. When the first candidate region of interest is configured with two or more colors, the processor 120 may determine the second candidate region of interest as the region of interest.

According to various embodiments, the processor 120 may acquire display attribute information of content corresponding to the region of interest of the first image layer and divide the acquired display attribute information into achromatic color information and chromatic color information. The processor 120 may acquire first brightness information from the display attribute information divided as achromatic color information and acquire first color information from the display attribute information divided as chromatic color information. According to an embodiment, the processor 120 may acquire Red, Green, and Blue (RGB) information and Hue, Saturation, and Value (HSV) information corresponding to each of the plurality of pixels from content included in the region of interest of the first image layer. The processor 120 may determine whether the corresponding HSV information is achromatic color information or chromatic color information on the basis of a chroma value and a brightness value included in the HSV information. For example, the processor 120 may divide the display attribute information into achromatic color information and chromatic color information on the basis of a table shown in [Table 1] below.

[Table 1] below corresponds to a table for determining an achromatic color.

TABLE 1

| Brightness value | Chroma value |
|---|---|
| Larger than or equal to 192 | Equal to or smaller than 10 |
| 128 to 191 | Equal to or smaller than 15 |
| 64 to 127 | Equal to or smaller than 30 |
| Equal to or smaller than 63 | Equal to or smaller than 50 |

In [Table 1], if a brightness value is larger than or equal to 192, the display attribute information may be divided as achromatic color information only when a chroma value is equal to or smaller than 10. In another example, if a brightness value is between 64 and 127 in [Table 1], the display attribute information may be divided as achromatic color information only when a chroma value is equal to or smaller than 30. [Table 1] is only an example, and various embodiments of the disclosure are not limited thereto. For example, the brightness values and the chroma values in [Table 1] are only examples, and may be changed by a service provider and/or a designer. In another example, an achromatic color and a chromatic color may be distinguished using various techniques known to those skilled in the are in various embodiments of the disclosure.

According to various embodiments, the processor 120 may determine second display attribute information related to the second image layer on the basis of the first display attribute information related to the first image layer. According to an embodiment, the processor 120 may determine at least one piece of second brightness information and second color information related to the second image layer on the basis of at least one piece of the first brightness information and the first color information related to the first image layer. For example, the processor 120 may determine second brightness information related to the second image layer on the basis of the first brightness information related to the first image layer. In another example, the processor 120 may determine second color information related to the second image layer on the basis of the first color information related to the first image layer. In another example, the processor 120 may determine at least one piece of the second brightness information and the second color information related to the second image layer on the basis of the first brightness information and the first color information related to the first image layer. According to an embodiment, the processor 120 may determine second display attribute information such that a second display attribute related to the second image layer has a value that is the same as or similar to the first display attribute. For example, when the first display attribute related to the first image layer is "first brightness information=a", the processor 120 may configure the second brightness information related to the second image layer as A or a' (for example, $a-\alpha<a'<a+\alpha$) corresponding to a value within a threshold range based on a. In another example, when the first display attribute related to the first image is "first color information=b", the processor 120 may configure the second color information related to the second image layer as b. According to an embodiment, the processor 120 may acquire basic display attribute information of the second image layer from at least one second content included in the second image layer and perform control to change the display attribute information of the second image layer from the basic display attribute information from the second display attribute information on the basis of a difference between the acquired basic display attribute information and the first display attribute information.

According to various embodiments, the processor 120 may change or maintain the second display attribute information on the basis of degradation information of the display related to the second image layer. The degradation information of the display may include a degradation level of at least one light-emitting element corresponding to at least one subpixel of the display. The degradation level may include information indicating light-emitting performance of the light-emitting element. According to an embodiment, the degradation information of the display related to the second image layer may include at least one of a degradation level of R-subpixels, a degradation of G-subpixels, and a degradation level of B-subpixels among a plurality of subpixels corresponding to the display region of the second image layer. The degradation levels of the subpixels may include, for example, at least one of an average display degradation level of the subpixels, a representative display degradation level of the subpixels, and a display degradation level of each subpixel. For example, the processor 120 may determine (for example, change or maintain) the second display attribute information determined on the basis of the first display attribute information on the basis of degradation information of the display related to the second image layer. For example, the processor 120 may determine at least one of a display-limited (or avoided) color and a display-recommended (or aimed) color on the basis of degradation information of the display area of the second image layer. For example, when the degradation level of the B-subpixels satisfies a predetermined condition (for example, equal to or smaller than a threshold degradation level), the processor 120 may determine blue colors (for example, blue colors larger than or equal to 200) corresponding to a predetermined range as the display-limited color. In another example, when the degradation level of the B-subpixels satisfies a predetermined condition (for example, equal to or smaller than a threshold degradation level), the processor 120 may determine a red or green color as a display-recommended color. The processor 120 may change or maintain the second color information included in the second display attribute information on the basis of the display-limited color or the display-recommended color. For example, when the second color information corresponds to the display-limited color, the processor 120 may change the second color information. For example, the processor 120 may change the second color information to a value that does not correspond to the display-limited color. For example, when the second color information is RGB (10, 5, 230) and the display-limited color indicates a blue color larger than or equal to 200, the processor 120 may change the second color information from RGB (10, 5, 230) to RGB (10, 5, 199). The processor 120 may change the second color information to another color value of at least one first content included in the first image layer. For example, when the second color information is RGB (10, 5, 230) and the display-limited color indicates a blue color larger than or equal to 200, the processor 120 may change the second color information from RGB (10, 5, 230) to RGB (190, 40, 30) acquired from first content. In another example, when the second color information corresponds to the display-recommended color, the processor 120 may maintain the second color information. As described above, maintaining or changing the second display attribute information is only an example, and the disclosure is not limited thereto. For example, the processor 120 may change or maintain the second display attribute information through various methods based on degradation information of the display of the second image layer.

According to various embodiments, the processor 120 may perform control to display the first image layer and the second image layer based on the second display attribute information on the display 210 of the display device 160. According to an embodiment, the processor 120 may control the display device 160 to display the second image layer on the basis of the second display attribute. According to an embodiment, in the state in which the first image layer is displayed according to an executed application, the processor 120 may control the display device 160 to additionally display the second image layer on the basis of the second display attribute. According to an embodiment, in the state in which the second image layer is overlaid on the first image layer, the processor 120 may control the display device 160 to change a display attribute of the second image layer on the basis of the second display attribute. According to an embodiment, in the state in which the first image layer and the second image layer are displayed in different regions, the processor 120 may control the display device 160 to change the display attribute of the second image layer on the basis of the second display attribute.

According to various embodiments, the processor 120 may detect an image change on the basis of at least one first content to be displayed through the first image layer and determine an image change interval and an image non-change interval (or an image stabilization interval) on the basis of the detection result. For example, the processor 120 may acquire a plurality of successive image frames to be displayed through the first image from the memory 130 or the camera module 180 and detect whether an image is changed within a predetermined range on the basis of at least one first content included in the plurality of successive image frames. The processor 120 may divide the plurality of successive image frames into an image change interval (for example, an interval in which a change beyond a predetermined range is detected) and an image non-change interval (or an image stabilization interval) (for example, an interval in which a change within the predetermined range is detected or no change is detected) on the basis of the detection result indicating whether an image is changed within the predetermined range). For example, when an image change of at least two successive image frames satisfies a first predetermined image change condition (for example, when an image change is equal to or smaller than a threshold change), the processor 120 may determine at least two successive images as images corresponding to the image non-change interval. In another example, when an image change of at least two successive image frames satisfies a second predetermined image change condition, (for example, when an image change is larger than a threshold change), the processor 120 may determine at least two successive images as images corresponding to the image change interval.

According to various embodiments, the processor 120 may perform control to change at least one of the brightness or the color of the second image layer on the basis of the image change detection result. For example, the processor 120 may determine second brightness information related to the second image layer on the basis of the first brightness information related to the first image layer during the image change interval, thereby performing control to change the brightness of the second image layer. The processor 120 may acquire first brightness information related to the first image layer according to a preset period during the image change interval and re-determine second brightness information related to the second image layer on the basis of the first brightness information acquired according to the preset period. The processor 120 may perform control to change the brightness of the second image layer according to a preset period on the basis of the second brightness information. In another example, the processor 120 may determine second brightness information and second color information related to the second image layer on the basis of the first brightness and the second color information related to the first image layer during the image non-change interval, thereby performing control to change the brightness and the color of the second image layer. The processor 120 may acquire first brightness information and first color information related to the first image layer once during the image non-change interval and determine second brightness and second color information related to the second image layer on the basis of the acquired first brightness information and first color information. The processor 120 may perform control to maintain the brightness and the color of the second image layer during the image non-change interval on the basis of the second brightness information and the second color information. When an image change of predetermined N (for example, 5) successive image frames is not detected, the processor 120 may determine an interval corresponding to the corresponding image frames as the image non-change interval.

In the above description, the processor 120 performs operations related to display attribute control according to various embodiments of the disclosure. However, various embodiments of the disclosure are not limited thereto. For example, at least some of the operations related to display attribute control may be performed by a display driver IC 230. For example, the processor 120 and/or the display driver IC 230 may be configured as illustrated in FIG. 3A, 3B, or 3C, and thus the operations related to display attribute control may be performed by the processor 120 and/or the display driver IC 230.

Figure 3A:
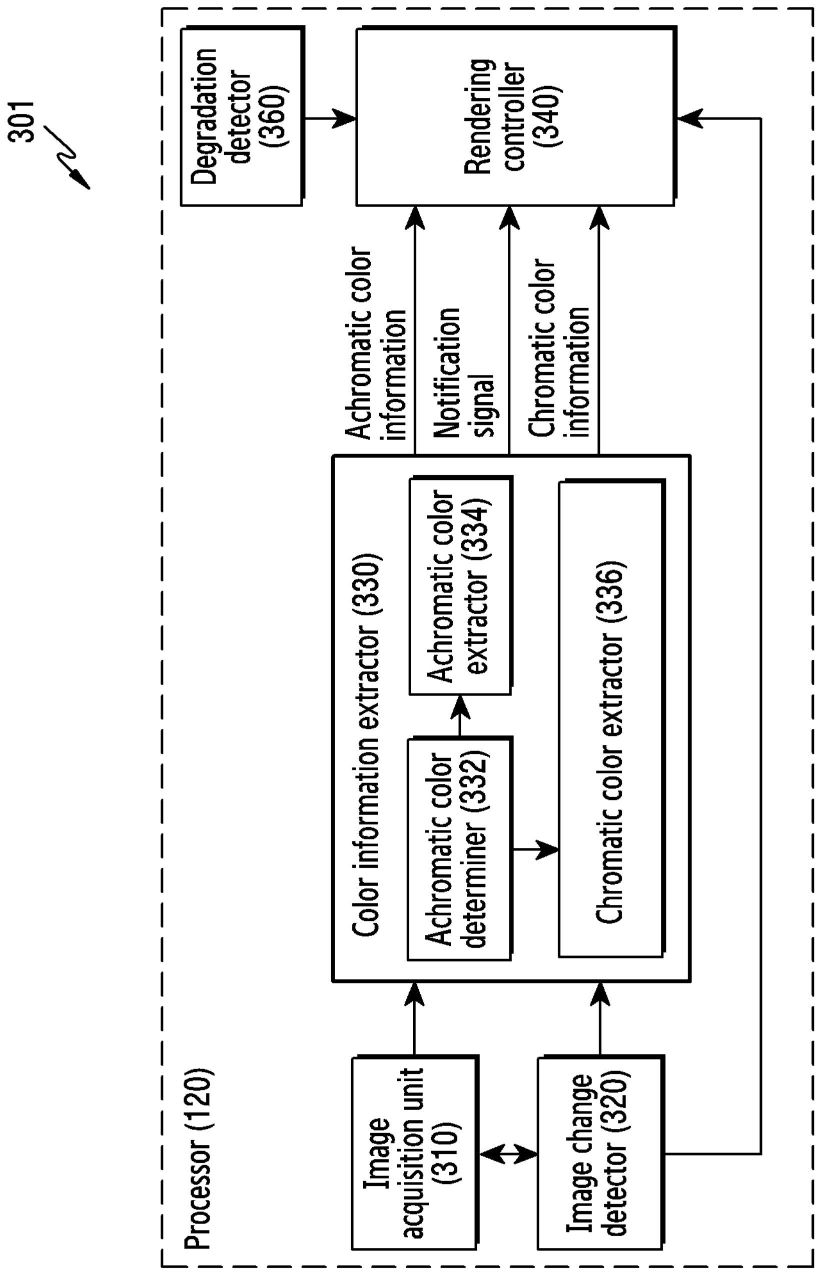
FIG. 3A is a block diagram 301 of a processor 120 according to various embodiments.
Figure 3B:
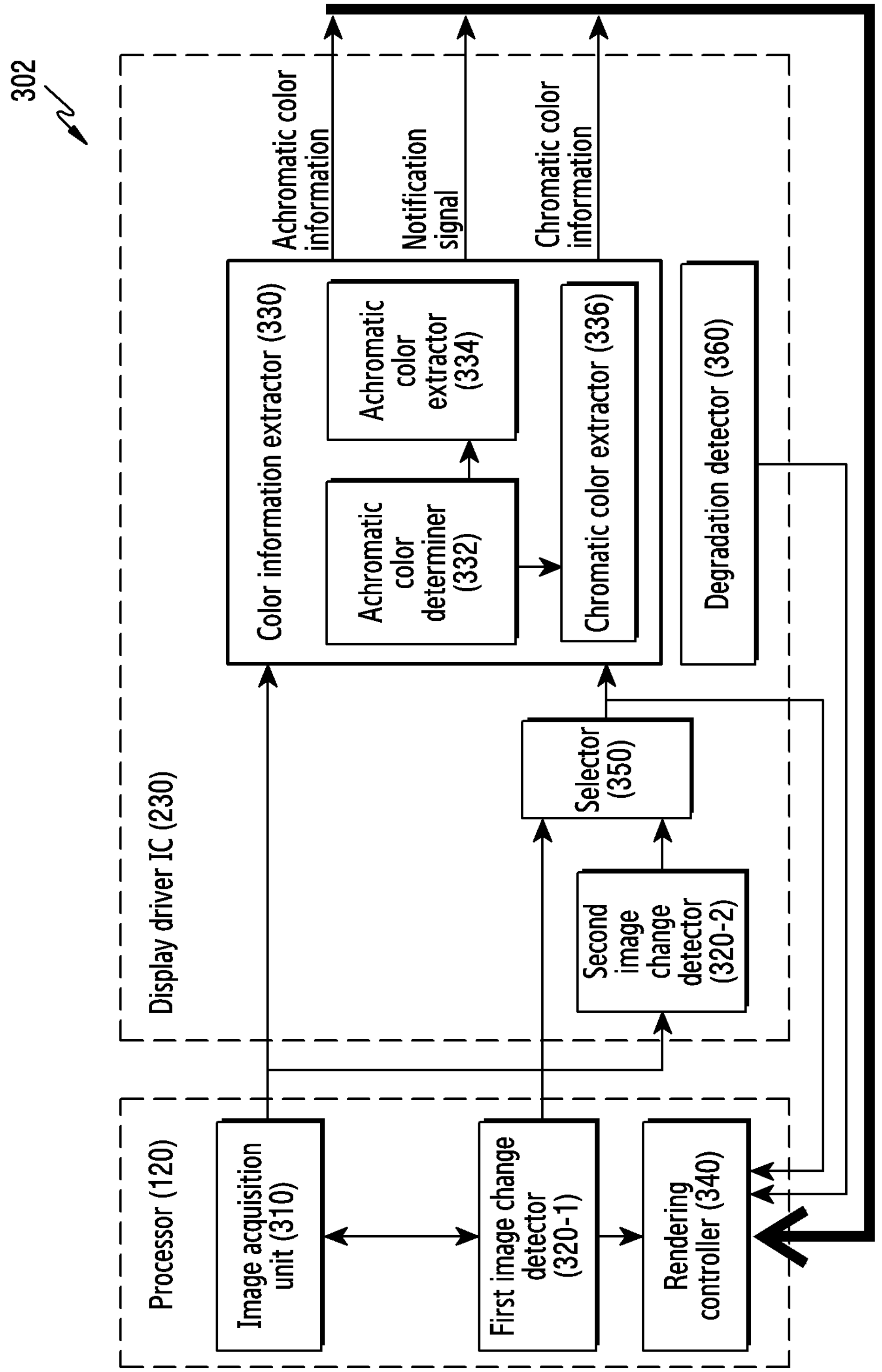
FIG. 3B is a block diagram 302 of the processor 120 and a display driver IC 230 according to various embodiments.
Figure 3C:
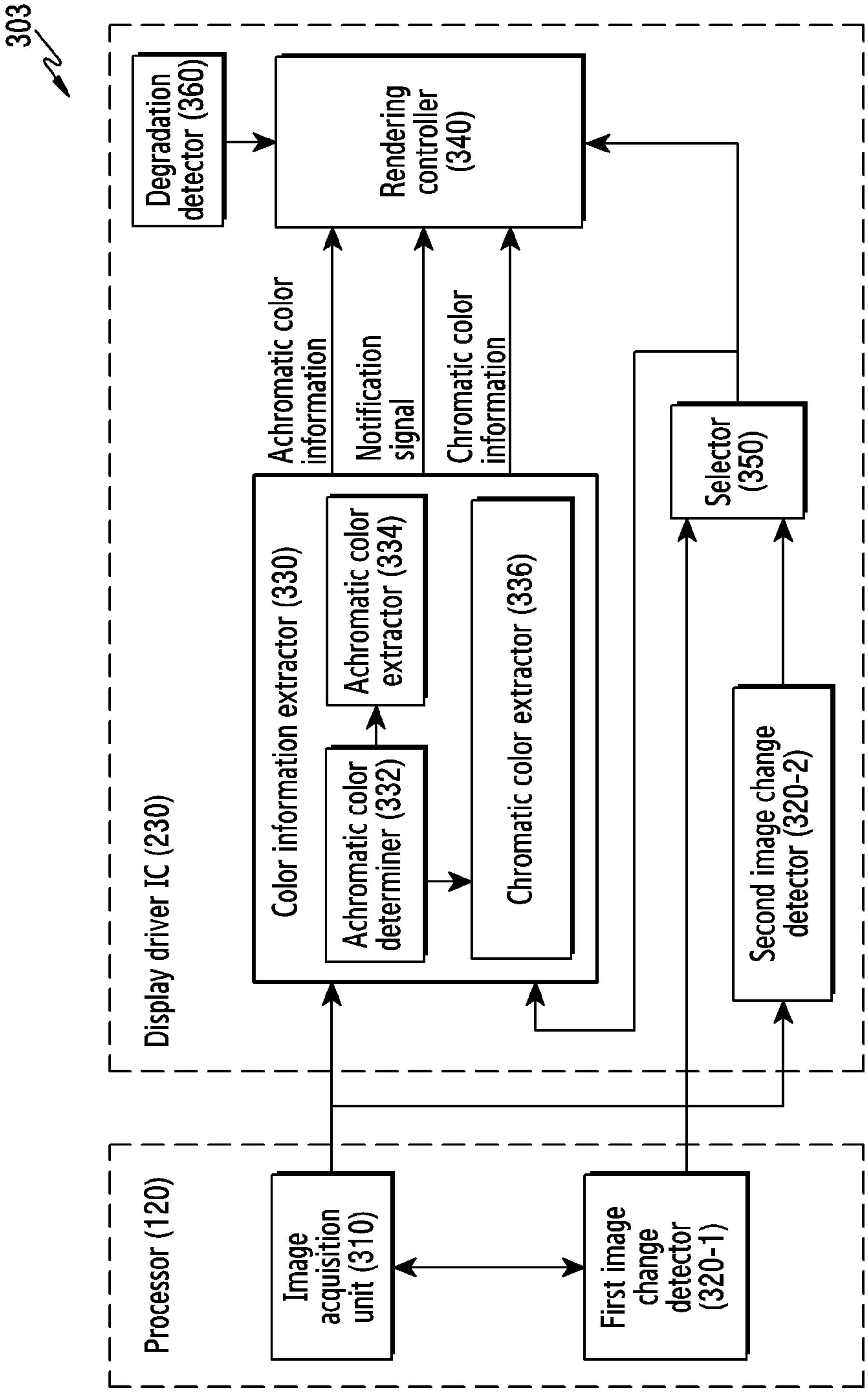
FIG. 3C is a block diagram 302 of the processor 120 and the display driver IC 230 according to various embodiments.

FIG. 3A is a block diagram 301 of the processor 120 according to various embodiments. The processor 120 of FIG. 3A may be the processor 120 illustrated in FIG. 1.

Referring to FIG. 3A, the processor 120 may include an image acquisition unit 310, an image change detector 320, a color information extractor 330, a rendering controller 340, or a degradation detector 360.

According to various embodiments, the image acquisition unit 310 may acquire a plurality of successive images including at least one first content to be displayed on the first image layer from the memory 130, the camera module 180, or the communication module 190. The image acquisition unit 310 may provide the plurality of acquired images to the color information extractor 330.

According to various embodiments, the image change detector 320 may detect an image change by monitoring the plurality of successive images acquired by the image acquisition unit 310. For example, the image change detector 320 may detect whether an image is changed within a predetermined range on the basis of at least one first content to be displayed on the first image layer and determine an image change interval (for example, an interval in which a change beyond a predetermined range is detected) and an image non-change interval (for example, an interval in which a change within the predetermined range is detected or no change is detected) on the basis of the detection result. For example, when an image change of a plurality of successive image frames satisfies a first predetermined image change condition (for example, when an image change is equal to or smaller than a threshold change), the processor 120 may determine the plurality of successive images as images corresponding to the image non-change interval. In another example, when an image change of a plurality of successive image frames satisfies a second predetermined image change condition (for example, when an image change is larger than a threshold change), the processor 120 may determine the plurality of successive images as images corresponding to the image change interval.

The image change detector 320 may provide a signal indicating the image change detection result to the color information extractor 330 and/or the rendering controller 340. According to an embodiment, the signal indicating the image change detection result may include information on at least one of the image change interval and the image non-change interval. For example, the signal indicating the image change detection result may include information indicating start and/or end of the image change interval and information indicating start and/or end of the image non-change interval. According to an embodiment, the signal indicating the image change detection result may include a trigger signal for re-determining (or changing) the second display attribute related to the second image layer.

According to various embodiments, the color information extractor 330 may include an achromatic color determiner 332, an achromatic color extractor 334, or a chromatic color extractor 336. The color information extractor 330 may acquire display attribute information from each of the plurality of successive images provided from the image acquisition unit 310 on the basis of a signal provided from the image change detector 320. For example, upon receiving the signal indicating the image change interval from the image change detector 320, the color information extractor 330 may acquire first brightness information from at least one of the plurality of successive images corresponding to the image change interval. In another example, upon receiving the signal indicating the image non-change interval from the image change detector 320, the color information extractor 330 may acquire first brightness information and first color information from at least one of the plurality of successive images corresponding to the image non-change interval. In another example, upon receiving a trigger signal from the image change detector 320, the color information extractor 330 may acquire at least one of the first brightness information or the first color information from at least one of the plurality of successive images in images input from the image change detector 320.

According to various embodiments, the achromatic color determiner 332 may acquire display attribute information from each of the plurality of successive images received from the image acquisition 310 and divide the acquired display attribute information into an achromatic color and a chromatic color. For example, the achromatic determiner 332 may acquire HSV information corresponding to each of a plurality of pixels from each of the plurality of successive images and determine whether the HSV information is achromatic color information or chromatic color information on the basis of a chroma value and a brightness value included in the HSV information. For example, the achromatic color determiner 332 may identify whether the corresponding HSV information is achromatic color information or chromatic color information on the basis of the table shown in [Table 1].

According to various embodiments, the achromatic color extractor 334 may extract first brightness information from display attribute information determined as the achromatic color. For example, the achromatic color extractor 334 may determine first brightness information on the basis of brightness values included in the HSV information determined as the achromatic color. The achromatic color extractor may provide achromatic color including the first brightness information to the rendering controller 340. The first brightness information may be determined as an average brightness value or a representative brightness value of the brightness values included in the HSV information determined as the achromatic color.

According to various embodiments, the chromatic extractor 336 may extract first color information from the display attribute information determined as the chromatic color. For example, the chromatic color extractor 336 may determine first color information on the basis of color values included in the HSV information determined as the chromatic color. The chromatic color extractor 336 may provide chromatic color information including the first color information to the rendering controller 340. According to an embodiment, when first color information is determined, the chromatic color extractor 336 may provide a signal indicating that the first color information is determined to the rendering controller 340. This to allow the rendering controller 340 to perform rendering on the basis of the first brightness information before the first color information is determined because a time spent for determining the first color information by the chromatic color extractor 336 is longer than a time spent for determining the first brightness information by the achromatic color extractor 224.

According to various embodiments, the degradation detector 360 may monitor a degradation level of the display related to the second image layer and determine degradation information of the display related to the second image layer on the basis of the monitored degradation level. For example, the degradation detector 360 may monitor a degradation level of a plurality of subpixels corresponding to the display region of the second image layer and determine degradation information of the display related to the second image layer on the basis of the degradation level of the plurality of monitored subpixels. According to an embodiment, the degradation information of the display related to the second image layer may include at least one of a degradation level of R-subpixels, a degradation of G-subpixels, and a degradation level of B-subpixels among a plurality of subpixels corresponding to the display region of the second image layer. The degradation levels of the subpixels may include at least one of an average display degradation level of the subpixels, a representative display degradation level of the subpixels, and a display degradation level of each subpixel. The degradation detector 360 may provide degradation information of the display related to the second image layer to the rendering controller 340. According to various embodiments, the rendering controller 340 may receive achromatic color information including first brightness information and chromatic color information including first color information from the color information extractor 330 and determine and/or change a display attribute of the second image layer on the basis of at least one piece of the achromatic color information or the chromatic color information. For example, the rendering controller 340 may determine second brightness information related to the second image layer on the basis of the first brightness information and perform control to display the second image layer on the basis of the second brightness information. In another example, the rendering controller 340 may determine second brightness information and/or second color information related to the second image layer on the basis of the first brightness information and the first color information and perform control to display the second image layer on the basis of the second brightness information and/or the second color information. For example, the rendering controller 340 may drive pixels of the display 210 corresponding to the display region of the second image layer on the basis of the second brightness information and/or the second color information. According to an embodiment, the rendering controller 420 may receive degradation information of the display related to the second image layer form the degradation detector 360 and determine and/or change the display attribute of the second image layer in consideration of the degradation information in addition to the achromatic color information and/or the chromatic color information. For example, the rendering controller 3420 may determine second color information on the basis of the first brightness information, the first color information, and the degradation information and perform control to display the second image layer on the basis of the second color information. In another example, the rendering controller 340 may determine second color information on the basis of the first brightness information and the first color information and change or maintain the second color information on the basis of the degradation information. The rendering controller 340 may drive pixels of the display 210 corresponding to the display region of the second image layer on the basis of the changed or maintained second color information. According to an embodiment, the rendering controller 340 may control a time point at which the determined and/or changed display attribute of the second image layer is applied to the second image layer on the basis of a signal indicating an image change detection result from the image change detector 320.

FIG. 3B is a block diagram 302 of the processor 120 and the display driver IC 230 according to various embodiments.

Referring to FIG. 3B, the processor 120 may include an image acquisition unit 310, a first image change detector 320-1, or a rendering controller 340, and the display driver IC 230 may include a second image change detector 320-2, a selector 350, a color information extractor 330, or a degradation detector 360. The image acquisition unit 310 of FIG. 3B may perform the same operation as the image acquisition unit 310 of FIG. 3A. The rendering controller 340 of FIG. 3B may perform the same operation as the rendering controller 340 of FIG. 3A. The color information extractor 330 of FIG. 3B may perform the same operation as the color information extractor 330 of FIG. 3A. The degradation detector 360 of FIG. 3B may perform the same operation as the degradation detector 360 of FIG. 3A. The first image change detector 320-1 of FIG. 3B may perform the same operation as the image change detector 320 of FIG. 3A. However, the first image change detector 320-1 of FIG. 3B may provide a signal indicating an image change detection result to the selector 350 connected to the color information extractor 330.

According to various embodiments, the second image change detector 320-2 may perform a similar operation as the first image change detector 320-1. According to an embodiment, the second change detector 320-2 may monitor a plurality of successive images provided from the image acquisition unit 310 of the processor 310 to the display driver IC 230 and detect an image change within a predetermined range. For example, the second image change detector 320-2 may detect whether an image is changed with a predetermined range on the basis of at least one first content to be displayed on the first image layer and determine an image change interval (for example, an interval in which a change beyond the predetermined range is made) and an image non-change interval (for example, an interval in which a change within the predetermined range is made). The second image change detector 320-2 may provide a signal indicating an image change detection result to the selector 350.

According to various embodiments, the selector 350 may provide one of the signal from the first image change detector 320-1 and the signal from the second image change detector 320-2 to the color information extractor 330. According to an embodiment, the selector 350 may include a multiplexer. For example, the selector 350 may provide one of the signal provided from the first image change detector 320-1 and the signal provided from the second image change detector 320-3 to the color information extractor 330 on the basis of a predetermined condition.

FIG. 3C is a block diagram 302 of the processor 120 and the display driver IC 230 according to various embodiments.

Referring to FIG. 3C, the processor 120 may include an image acquisition unit 310 or a first image change detector 320-1, and the display driver IC 230 may include a second image change detector 320-2, a selector 350, a color information extractor 330, a rendering controller 340, or a degradation detector 360. The image acquisition unit 310 of FIG. 3C may perform the same operation as the image acquisition unit 310 of FIG. 3A. The color information extractor 330 of FIG. 3C may perform the same operation as the color information extractor 330 of FIG. 3A. The rendering controller 340 of FIG. 3C may perform the same operation as the rendering controller 340 of FIG. 3A. The first image change detector 320-1 of FIG. 3C may perform the same operation as the image change detector 320 of FIG. 3B. The second image change detector 320-2 of FIG. 3C may perform the same operation as the second image change detector 320-2 of FIG. 3B. The selector 350 of FIG. 3C may perform the same operation as the selector 350 of FIG. 3B. The degradation detector 360 of FIG. 3C may perform the same operation as the degradation detector 360 of FIG. 3A.

Although it has been described that the degradation detector 360 is included in the display driver IC 350 in FIGS. 3A and 3C, this is only an example and the disclosure is not limited thereto. For example, in FIGS. 3B and 3C, the degradation detector 360 may be included in the processor 120.

According to various embodiments, an electronic device (for example, the electronic device 101 of FIG. 1) may include a display (for example, the display device 160 of FIG. 1), and a processor (for example, the processor 120 of FIG. 1), and the processor 120 may be configured to identify first information related to a brightness of at least one first content included in a first image layer to be displayed on the display 160 and second information related to a brightness of at least one second content included in a second image layer to be displayed on the display 160, control the brightness of the second image layer, based on at least a difference between the first information and the second information, and display the at least one first content and the second content of which the brightness is controlled on the display 160 in a state in which the second image layer is overlaid on the first image layer including the first content.

According to various embodiments, the processor 120 may be configured to control the brightness of the second content when the difference between the first information and the second information satisfies a predetermined first condition and maintain the brightness of the second content when the difference between the first information and the second information satisfies a predetermined second condition.

According to various embodiments, the processor 120 may be configured to identify at least one piece of third information related to a color of the first content to be displayed on the display 160 or degradation information of the display related to the second image layer and control the color of the second content, based on at least one piece of the third information or the degradation information of the display related to the second image layer.

According to various embodiments, the processor 120 may be configured to identify fourth information related to the color of the second content and control the color of the second content, based on at least a difference between the third information and fourth information.

According to various embodiments, the processor 120 may be configured to control the color of the second content when the difference between the third information and the fourth information satisfies a predetermined third condition and maintain the color of the second content when the difference between the third information and the fourth information satisfies a predetermined fourth condition.

According to various embodiments, the processor 120 may be configured to re-control, based on the degradation information of the display related to the second image layer, the color of the second content controlled based on at least the difference between the third information and the fourth information, and the degradation information of the display related to the second image layer includes a degradation level of at least one subpixel corresponding to a display region of the second image layer.

According to various embodiments, the processor 120 may be configured to configure at least one region of interest for the first image layer, acquire brightness information from at least a part of the at least one region of interest in the at least one first content included in the first image layer, and identify the first information, based on the acquired brightness information.

According to various embodiments, the processor 120 may be configured to acquire color information from at least a part corresponding to the region of interest in the at least one first content included in the first image layer, identify third information related to a color of the first content, based on the acquired color information, and control a color of the second content, based on at least the third information.

According to various embodiments, the processor 120 may be configured to determine at least some of a first region corresponding to an entire region of the first image layer or a second region corresponding to at least some of the entire region of the first image layer adjacent to the second image layer as the at least one region of interest.

According to various embodiments, the processor 120 may be configured to acquire color information of at least a part of the first content corresponding to the second region and determine at least one of the first region or the second region as the region of interest, based on whether the acquired color information satisfies a reference condition.

According to various embodiments, the processor 120 may be configured to identify whether an image change of images displayed through the first image layer satisfies a first predetermined image change condition, based on the at least one first content and control at least one of the brightness or a color of the second content while the image change of the images displayed through the first image satisfies the first predetermined image change condition.

According to various embodiments, the processor 120 may be configured to control the brightness of the second content while the image change of the images displayed through the first image satisfies a second predetermined image change condition.

According to various embodiments, the processor 120 may be configured to acquire achromatic color information from the at least one first content and determine the first information, based on the achromatic color information, and the achromatic color information is acquired based on at least one of a brightness reference value or a chroma reference value.

According to various embodiments, the processor 120 may be configured to acquire chromatic color information from the at least one first content, determine third information related to a color of the first content, based on the chromatic color information, and control a color of the second content, based on the third information.

According to various embodiments, an electronic device (for example, the electronic device 101 of FIG. 1) may include a display (for example, the display device 160 of FIG. 1) and a processor (for example, the processor 120 of FIG. 1), and the processor 120 may be configured to identify first information related to a brightness of a first image layer including at least one first content to be displayed on the display 160 and second information related to a brightness of a second image layer including at least one second content to be displayed on the display 160, control the brightness of the second image layer, based on at least a difference between the first information and the second information, and display the at least one first content and the at last one second content on the display 160 in a state in which the second image layer of which the brightness is controlled is overlaid on the first image layer.

According to various embodiments, the processor 120 may be configured to identify at least one piece of third information related to a color of the first image layer to be displayed on the display 160 or degradation information of the display related to the second image layer and control a color of the second image layer, based on at least one piece of the third information or the degradation information of the display related to the second image layer.

According to various embodiments, the processor 120 may be configured to configure at least one region of interest for the first image layer, acquire brightness information from at least a part of the first image layer corresponding to the region of interest, and identify the first information, based on the acquired brightness information.

According to various embodiments, the processor 120 may be configured to track an image change of images displayed through the first image layer and control at least one of the brightness or a color of the second image layer while the image change of the images displayed through the first image layer satisfies a first predetermined image change condition.

According to various embodiments, the processor 120 may be configured to control the brightness of the second image layer while the image change of the images displayed through the first image layer satisfies a second predetermined image change condition.

According to various embodiments, an electronic device (for example, the electronic device 101 of FIG. 1) may include a display (for example, the display device 160 of FIG. 1) and a processor (for example, the processor 120 of FIG. 1), and the processor 120 may be configured to determine first display attribute information related to a first image layer including at least one first content to be displayed on the display 160, determine second display attribute information related to a second image layer including at least one second content to be displayed on the display 160, based on the first display attribute information, and display the first image layer and the second image layer based on the determined second display attribute information on the display 160.

According to various embodiments, the first display attribute information may include at least one piece of brightness information or color information related to the first image layer and the second display attribute information may include at least one piece of brightness information or color information to be used for displaying the second image layer.

Figure 4:
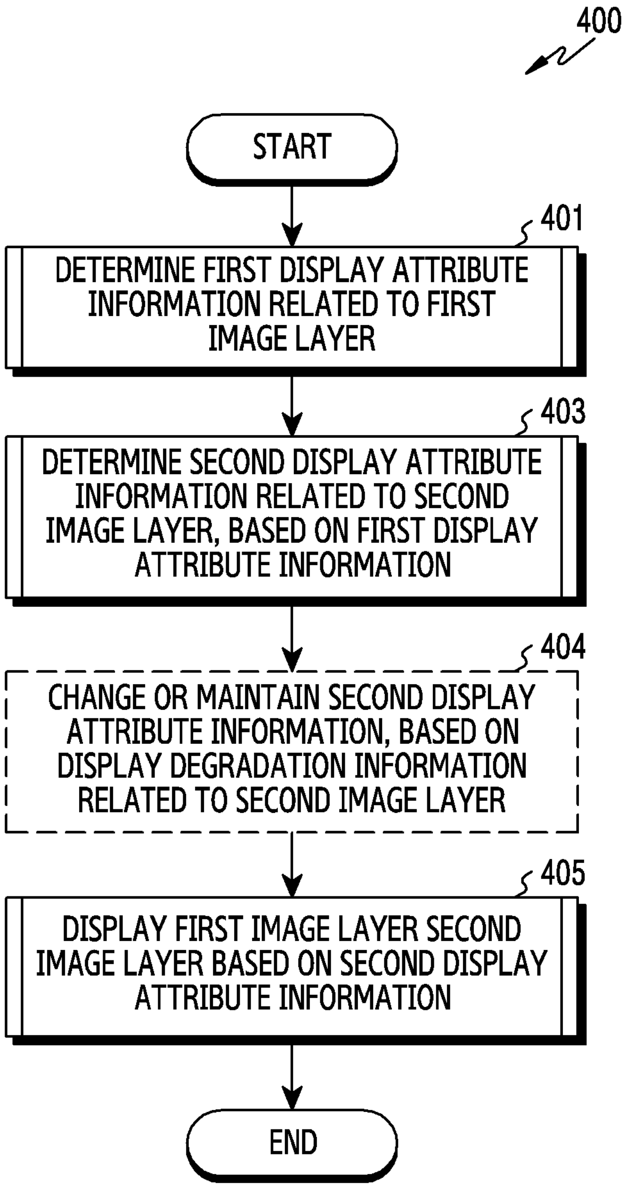
FIG. 4 is a flowchart 400 illustrating a process in which the electronic device 101 controls a display attribute according to various embodiments.
Figure 5:
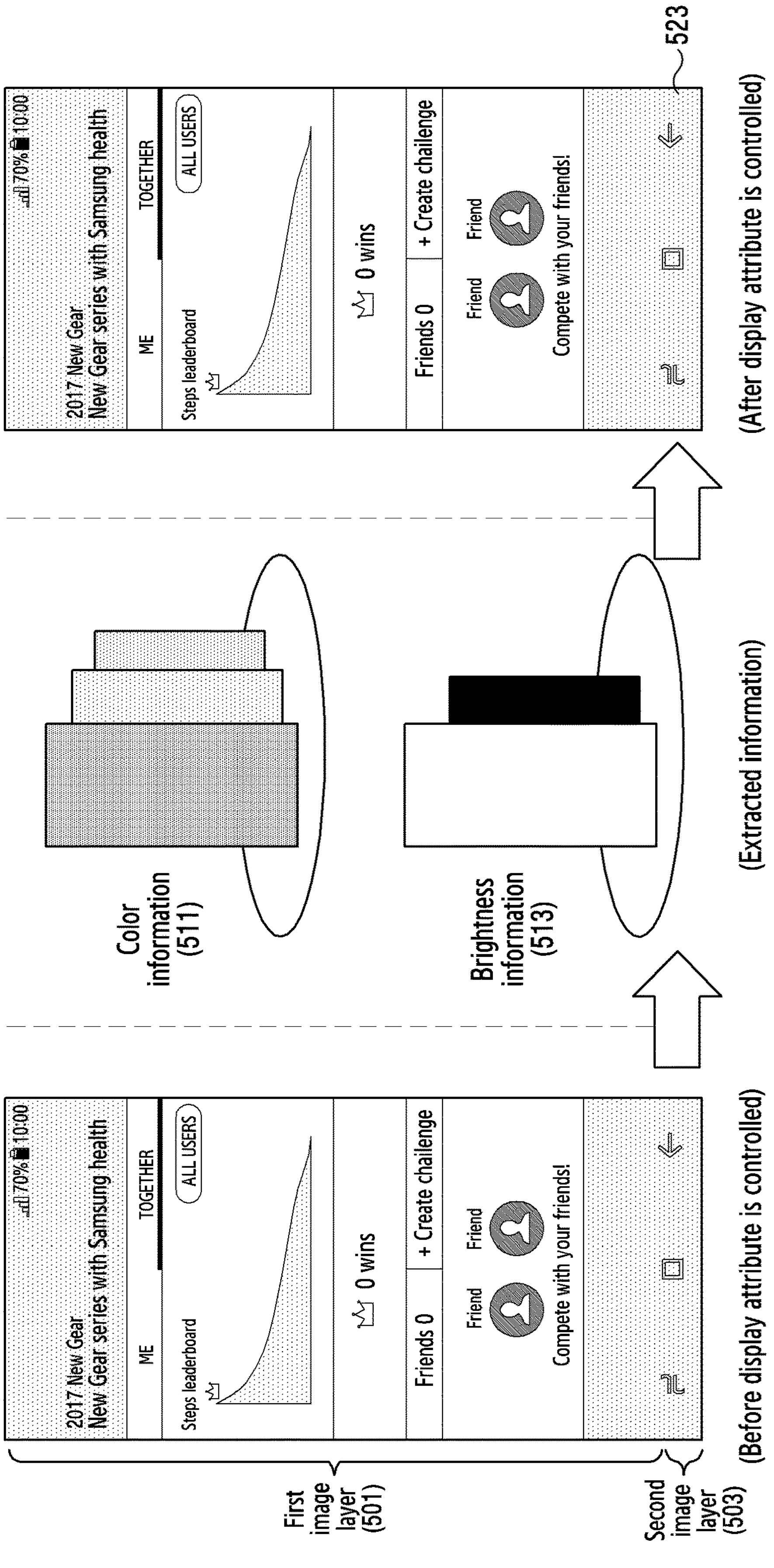
FIG. 5 illustrates an example in which the electronic device 101 controls the display attribute according to various embodiments.

FIG. 4 is a flowchart 400 illustrating a process in which the electronic device 101 controls a display attribute according to various embodiments. In the following embodiments, respective operations may be sequentially performed but the sequential performance is not necessary. For example, orders of the operations may be changed, and at least two operations may be performed in parallel. Hereinafter, an operation expressed by dotted lines may be omitted according to an embodiment. Hereinafter, the operation of an electronic device (for example, the processor 120 or the display driver IC 230) will be described with reference to FIG. 5. FIG. 5 illustrates an example in which the electronic device 101 controls the display attribute according to various embodiments.

According to various embodiments, the electronic device (for example, the processor 120 of FIG. 1 or the display driver IC 230 of FIG. 2) may determine first display attribute information related to the first image layer in operation 401. For example, the processor 120 or the display driver IC 230 of the electronic device may determine first display attribute information related to the first image layer among a plurality of image layers to be displayed on the display 210. The first image layer may include at least one first content related to an application being executed. For example, as illustrated in FIG. 5, when an application for managing user's health is being executed, a first image layer 501 may include exercise-related information of the user. The first display attribute information may include first brightness information and/or first color information. For example, as illustrated in FIG. 5, the processor 120 or the display driver IC 230 of the electronic device may extract color information 511 and/or brightness information 513 from at least one first content included in the first image layer 501 and determine first brightness information and/or first color information on the basis of the extracted color information 511 and/or brightness information 513. The first brightness information may include a representative value or an average brightness value of brightness values included in the brightness information 513 extracted from at least one first content included in the first image layer 501. The representative value may include a brightness value selected by a preset scheme among from the brightness values included in the brightness information 513. However, various embodiments of the disclosure are not limited thereto. The first color information may include a representative color value of the color values included in the color information 511 extracted from at least one first content included in the first image layer 501. The representative color value may include a color value selected by a preset scheme among from the color values included in the color information 511. However, various embodiments of the disclosure are not limited thereto.

According to various embodiments, the electronic device (for example, the processor 120 or the display driver IC 230) may determine second display attribute information related to the second image layer on the basis of the first display attribute information in operation 403. For example, the processor 120 or the display driver IC 230 of the electronic device may determine second display attribute information related to the second image layer on the basis of the first display attribute information related to the first image layer among a plurality of image layers to be displayed on the display 210. The second image layer may include fixed second content that is not changed by at least one application being executed. For example, at least one second content included in the second image layer may include at least one icon (or symbol) indicating a preset menu item (for example, viewing a recent usage history, a home screen shortcut, or return). However, various embodiments of the disclosure are not limited thereto. The second display attribute information may include second brightness information and/or second color information. The second brightness information may include a brightness value of the second image layer to be displayed, and the second color information may include a color value of the second image layer to be displayed. According to an embodiment, the processor 120 or the display driver IC 230 of the electronic device may determine second display attribute information such that the second display attribute related to the second image layer has the same value as or a similar value to the first display attribute. For example, when the first display attribute related to the first image layer is "first brightness information=A", the processor 120 or the display driver IC 230 of the electronic device may configure the second brightness information related to the second image layer as A or a value within a threshold range based on A. According to an embodiment, the processor 120 or the display driver IC 230 of the electronic device may acquire basic display attribute information of the second image layer from at least one second content included in the second image layer and perform control to change the display attribute information of the second image layer from the basic display attribute information from the second display attribute information on the basis of a difference between the acquired basic display attribute information and the first display attribute information.

According to various embodiments, the processor 120 or the display driver IC 230 of the electronic device may change or maintain the second display attribute information on the basis of display degradation information related to the second image layer in operation 404. For example, the processor 120 or the display driver IC 230 of the electronic device may change or maintain the second display attribute information determined in operation 403 on the basis of degradation information of subpixels corresponding to the display region of the second image layer. The degradation information of the subpixels corresponding to the display region of the second image layer may include at least one of a degradation level of R-subpixels, a degradation level of G-subpixels, or a degradation level of B-subpixels. The degradation levels of the subpixels may include, for example, at least one of an average display degradation level of the subpixels, a representative display degradation level of the subpixels, and a display degradation level of each subpixel. According to an embodiment, the processor 120 or the display driver IC 230 of the electronic device may determine at least one of a display-limited (or avoided) color or a display-recommended (or aimed) color on the basis of the display degradation information related to the second image layer. For example, when the degradation level of the B-subpixels satisfies a predetermined condition (for example, equal to or smaller than a threshold degradation level), the processor 120 or the display driver IC 230 of the electronic device may determine blue values (for example, blue values larger than or equal to 200) corresponding to a predetermined range as the display-limited color. In another example, when degradation level of the B-subpixels satisfies a predetermined condition (for example, equal to or smaller than a threshold degradation level), the processor 120 or the display driver IC 230 of the electronic device may determine a red or green color as the display-recommended color. The processor 120 or the display driver IC 230 of the electronic device may change or maintain the second color information included in the second display attribute information on the basis of the display-limited color or the display-recommended color. For example, when the second color information corresponds to the display-limited color, the processor 120 or the display driver IC 230 of the electronic device may change the second color information. For example, the processor 120 or the display driver IC 230 of the electronic device may change the second color information to a value that does not correspond to the display-limited color. The processor 120 may change the second color information to another color value of at least one first content included in the first image layer. In another example, when the second color information corresponds to the display-recommended color, the processor 120 may maintain the second color information. This is only an example, and the disclosure is not limited thereto. For example, the processor 120 or the display driver IC 230 of the electronic device may change or maintain the second display attribute information through various methods based on the display degradation information of the second image layer.

According to various embodiments, the electronic device (the processor 120 or the display driver IC 230) may control the display 210 to display the first image layer and the second image layer based on the second display attribute information in operation 405. For example, the processor 120 or the display driver IC 230 of the electronic device may control the display 210 to change and display the color and brightness of the second image layer 523 on the basis of the second display attribute information as illustrated in FIG. 5. According to an embodiment, the processor 120 or the display driver IC 230 of the electronic device may control the display 210 to display the second image layer on the basis of the second display attribute while controlling the display 210 of the display device 160 to display the first image layer according to an application being executed. According to an embodiment, the processor 120 or the display driver IC 230 of the electronic device may control the display 210 to additionally display the second image layer on the basis of the second display attribute in the state in which the first image layer is displayed according to an application being executed. According to an embodiment, the processor 120 or the display driver IC 230 of the electronic device may control the display 210 to change the display attribute of the second image layer on the basis of the second display attribute in the state in which the second layer is overlaid on the first image layer. According to an embodiment, the processor 120 or the display driver IC 230 of the electronic device may control the display 210 to change the display attribute of the second image layer on the basis of the second display attribute in the state in which the first image layer and the second image layer are displayed in different regions.

Figure 6:
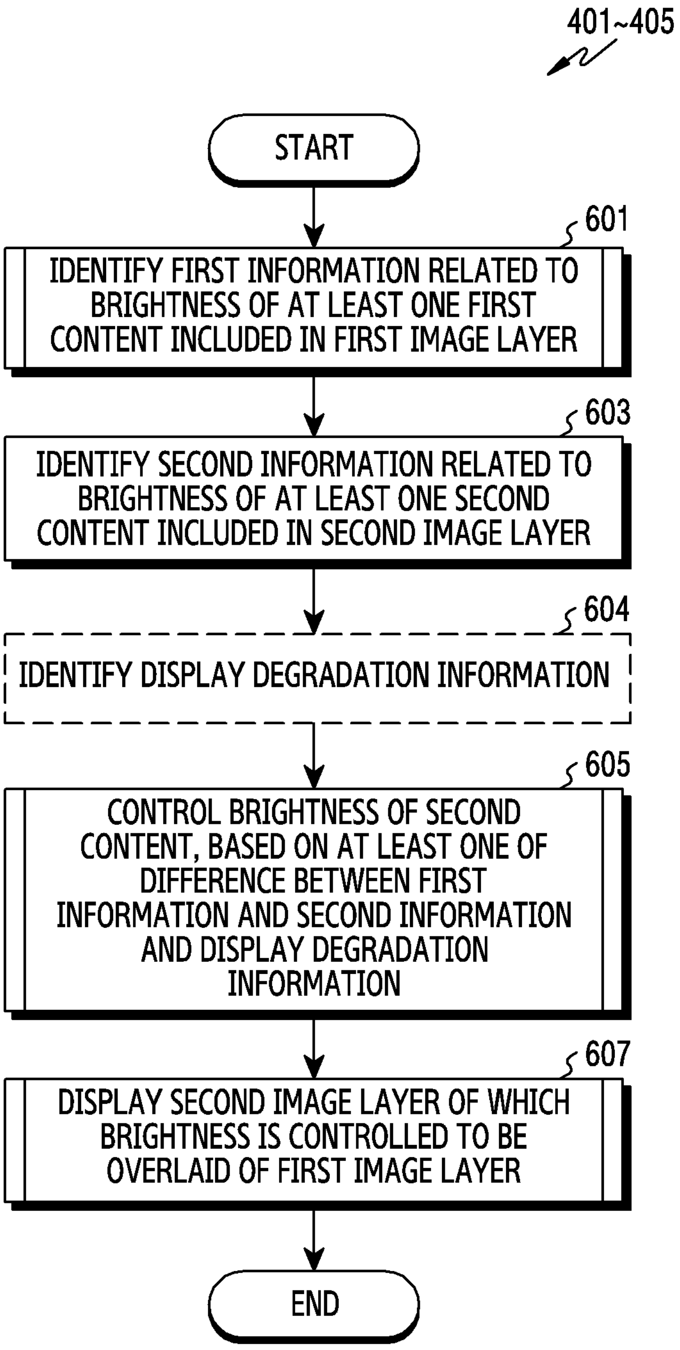
FIG. 6 is a flowchart illustrating a process in which the electronic device 101 controls brightness according to various embodiments.
Figure 7:
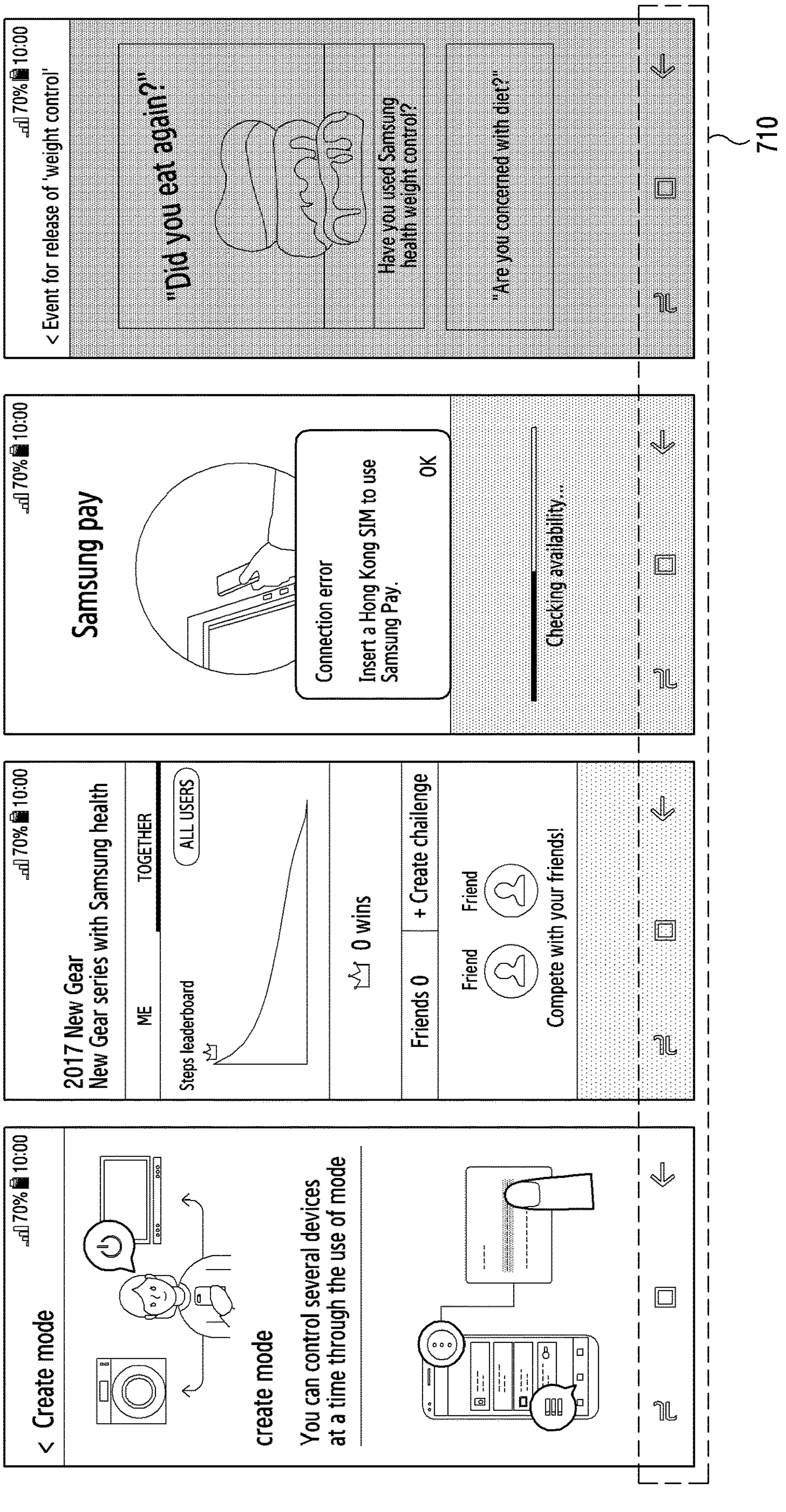
FIG. 7 illustrates an example in which the electronic device 101 controls brightness according to various embodiments.

FIG. 6 is a flowchart illustrating a process in which the electronic device 101 controls brightness according to various embodiments. An operation of FIG. 6 described below may be at least the part of detailed description of operations 401 to 405 of FIG. 4. In the following embodiments, respective operations may be sequentially performed but the sequential performance is not necessary. For example, orders of the operations may be changed, and at least two operations may be performed in parallel. Hereinafter, an operation expressed by dotted lines may be omitted according to an embodiment. Hereinafter, an operation of an electronic device (for example, the processor 120 of FIG. 1 or the display driver IC 230 of FIG. 2) will be described with reference to FIG. 7. FIG. 7 illustrates an example in which the electronic device 101 controls brightness according to various embodiments.

According to various embodiments, the electronic device (for example, the processor 120 or the display driver IC 230) may identify first information related to brightness of at least one first content included in the first image layer in operation 601. For example, the processor 120 or the display driver IC 230 of the electronic device may identify first information related to brightness of at least one first content included in the first image to be displayed on the display 210. The first information related to brightness of at least one first content may be determined on the basis of brightness values corresponding to at least one first content included in the first image layer. For example, the processor 120 or the display driver IC 230 of the electronic device may acquire an average brightness value or a representative brightness value of the brightness values corresponding to at least one first content included in the first image layer and determine the acquired average brightness value or representative brightness value as the first information. The representative brightness value may include a brightness value selected by a preset scheme among from the brightness values corresponding to at least one first content.

According to various embodiments, the electronic device (for example, the processor 120 or the display driver IC 230) may identify second information related to brightness of at least one second content included in the second image layer in operation 603. For example, the processor 120 or the display driver IC 230 of the electronic device may identify second information related to brightness of at least one second content included in the second image layer to be displayed on the display 210. The second information related to brightness of at least one second content may be determined on the basis of brightness values corresponding to at least one second content included in the second image layer. For example, the processor 120 or the display driver IC 230 of the electronic device may acquire an average brightness value or a representative brightness value of the brightness values corresponding to at least one second content included in the second image layer and determine the acquired average brightness value or representative brightness value as the second information. The representative value may include a brightness value selected by a preset scheme among from the brightness values corresponding to at least one second content. According to an embodiment, the processor 120 or the display driver IC 230 of the electronic device may determine second information on the basis of the brightness values of predetermined content among second content included in the second image layer. For example, when the second content included in the second image layer includes at least one icon (or symbol) indicating a preset menu item and a background of the menu item, the second information may be determined on the basis of brightness values of the background.

According to various embodiments, the electronic device (for example, the processor 120 or the display driver IC 230) may identify display degradation information related to the second image layer in operation 604. For example, the processor 120 or the display driver IC 230 of the electronic device may monitor a degradation level of a plurality of subpixels corresponding to the display region of the second image layer and determine display degradation information related to the second image layer on the basis of the degradation level of the plurality of monitored subpixels. The display degradation information related to the second image layer may include at least one of a degradation level of R-subpixels, a degradation level of G-subpixels, or a degradation level of B-subpixels among a plurality of subpixels corresponding to the display region of the second image layer. The degradation levels of the subpixels may include at least one of an average display degradation level of the subpixels, a representative display degradation level of the subpixels, and a display degradation level of each subpixel.

According to various embodiments, the electronic device (for example, the processor 120 or the display driver IC 230) may control brightness of the second content on the basis of at least one of a difference between the first information and the second information or the display degradation information in operation 605. According to an embodiment, the processor 120 or the display driver IC 230 of the electronic device may determine whether to control the brightness of the second content on the basis of the difference between the first information and the second information and a preset reference range. For example, when the difference between the first information and the second information satisfies a predetermined first condition (for example, larger than a reference range), the processor 120 or the display driver IC 230 of the electronic device may control the brightness of the second content on the basis of the difference between the first information and the second information. In another example, when the difference between the first information and the second information satisfies a second condition (or does not satisfy the predetermined first condition) (for example, smaller than a reference range), the processor 120 or the display driver IC 230 of the electronic device may maintain the brightness of the second content. According to an embodiment, the processor 120 or the display driver IC 230 of the electronic device may control the brightness of the second content such that the brightness of at least one second content included in the second image layer is changed by the difference between the first information and the second information. According to an embodiment, the processor 120 or the display driver IC 230 of the electronic device may control the brightness of the second content on the basis of the difference between the first information and the second information and the display degradation information related to the second image layer. According to an embodiment, the processor 120 or the display driver IC 230 of the electronic device may perform control to change a brightness value of predetermined contents among a plurality of second contents included in the second image layer from the second information to the first information.

According to various embodiments, the electronic device (for example, the processor 120 or the display driver IC 230) may control the display 210 to display the second image layer of which the brightness is controlled to be overlaid on the first image layer in operation 607. For example, the processor 120 or the display driver IC 230 of the electronic device may control the display 210 to display at least one first content and the second content of which the brightness is controlled in the state in which the second image layer is overlaid on the first image layer including first content. For example, the processor 120 or the display driver IC 230 of the electronic device may control the display 210 such that a second image layer 710 having brightness controlled to be similar to brightness of the first image layer is displayed on the first image layer as illustrated in FIG. 7. Displaying the second image layer to be overlaid on the first image layer is only an example, and various embodiments of the disclosure are not limited thereto. For example, the processor 120 or the display driver IC 230 of the electronic device may control the display 210 to display the first image layer and the second image layer including at least one second content of which the brightness is controlled in different regions.

Figure 8:
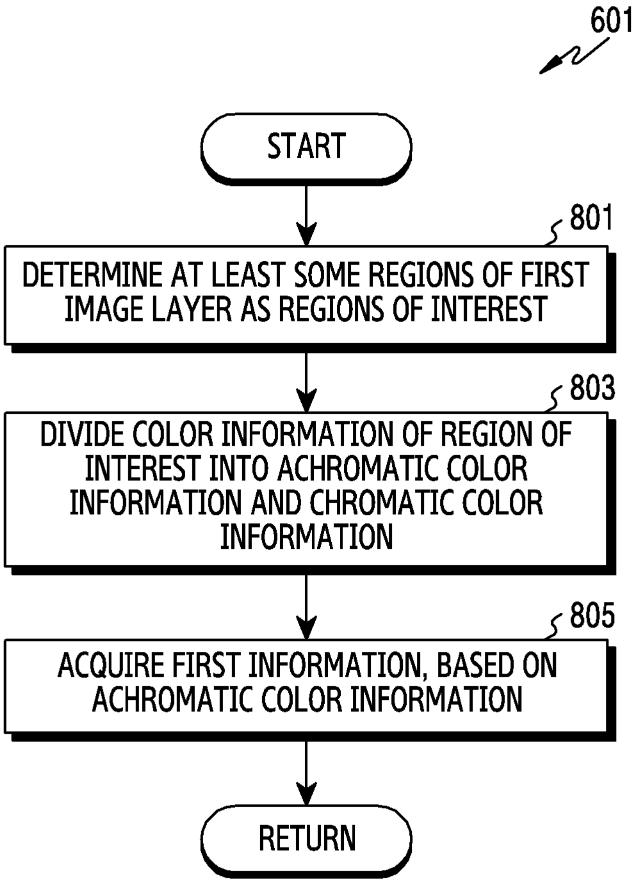
FIG. 8 is a flowchart illustrating a process in which the electronic device 101 acquires brightness information according to various embodiments.
Figure 9A:
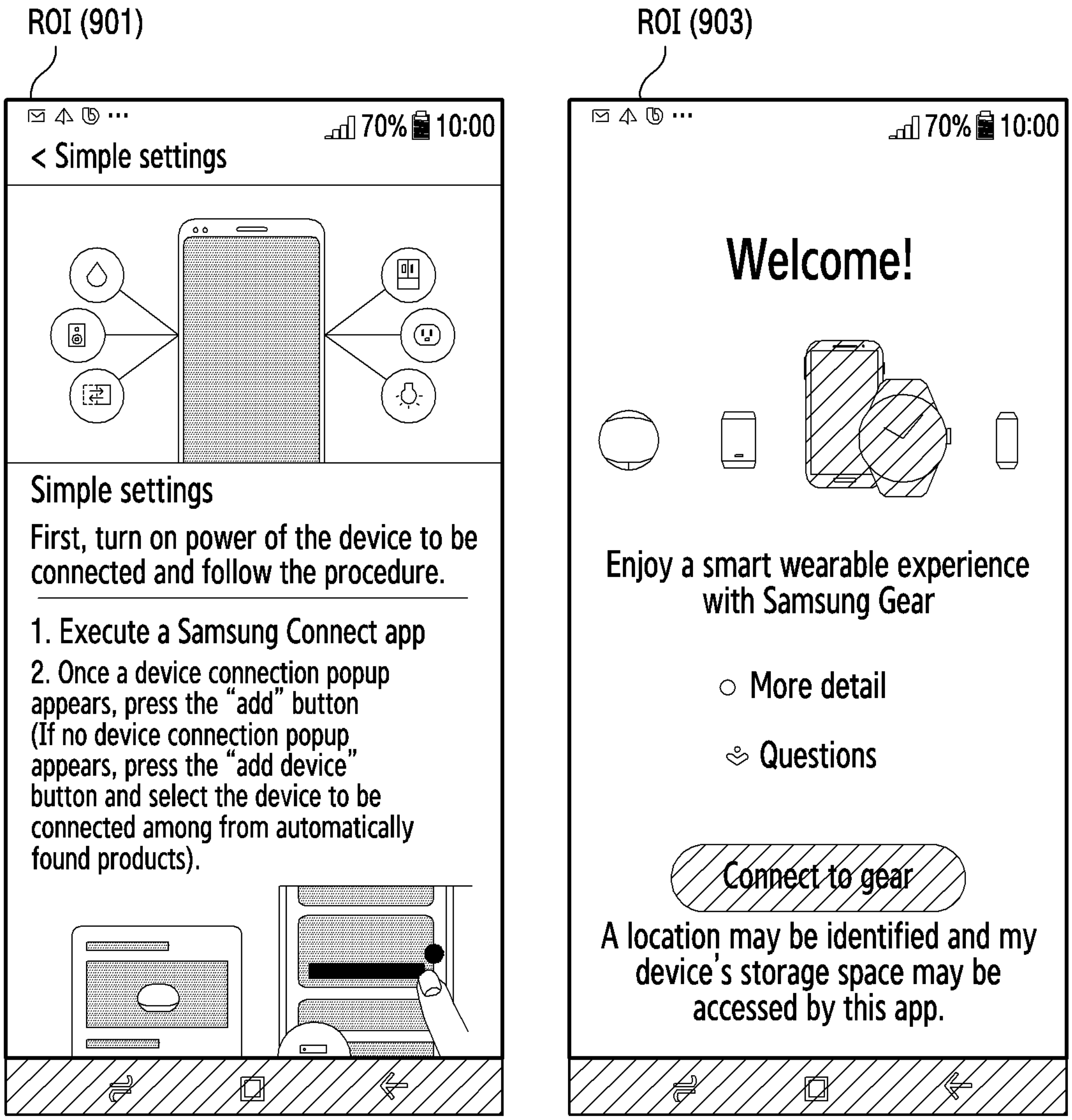
FIGS. 9A and 9B illustrate a region of interest to acquire brightness information by the electronic device 101 according to various embodiments.
Figure 9B:
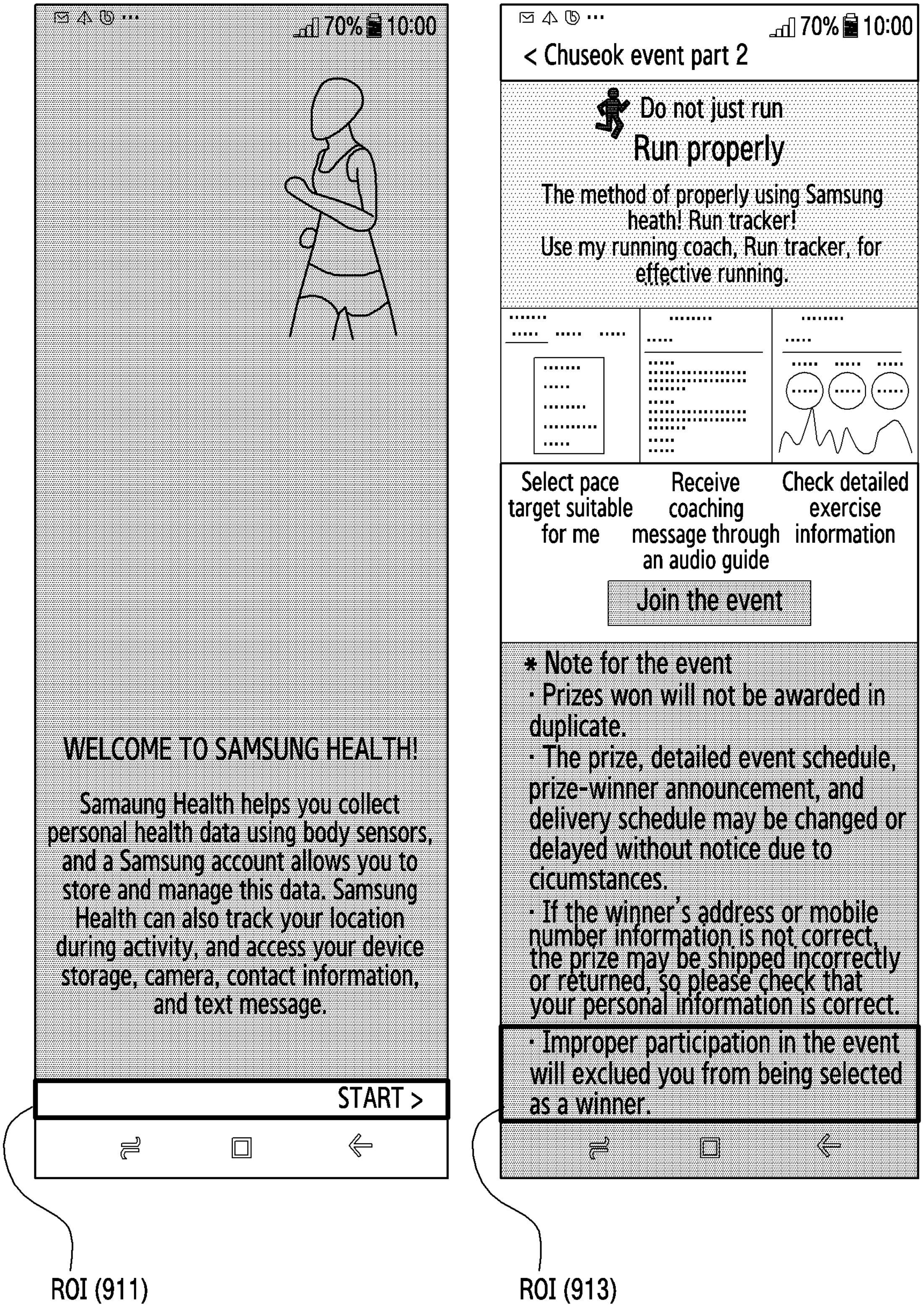
Figure 10A:
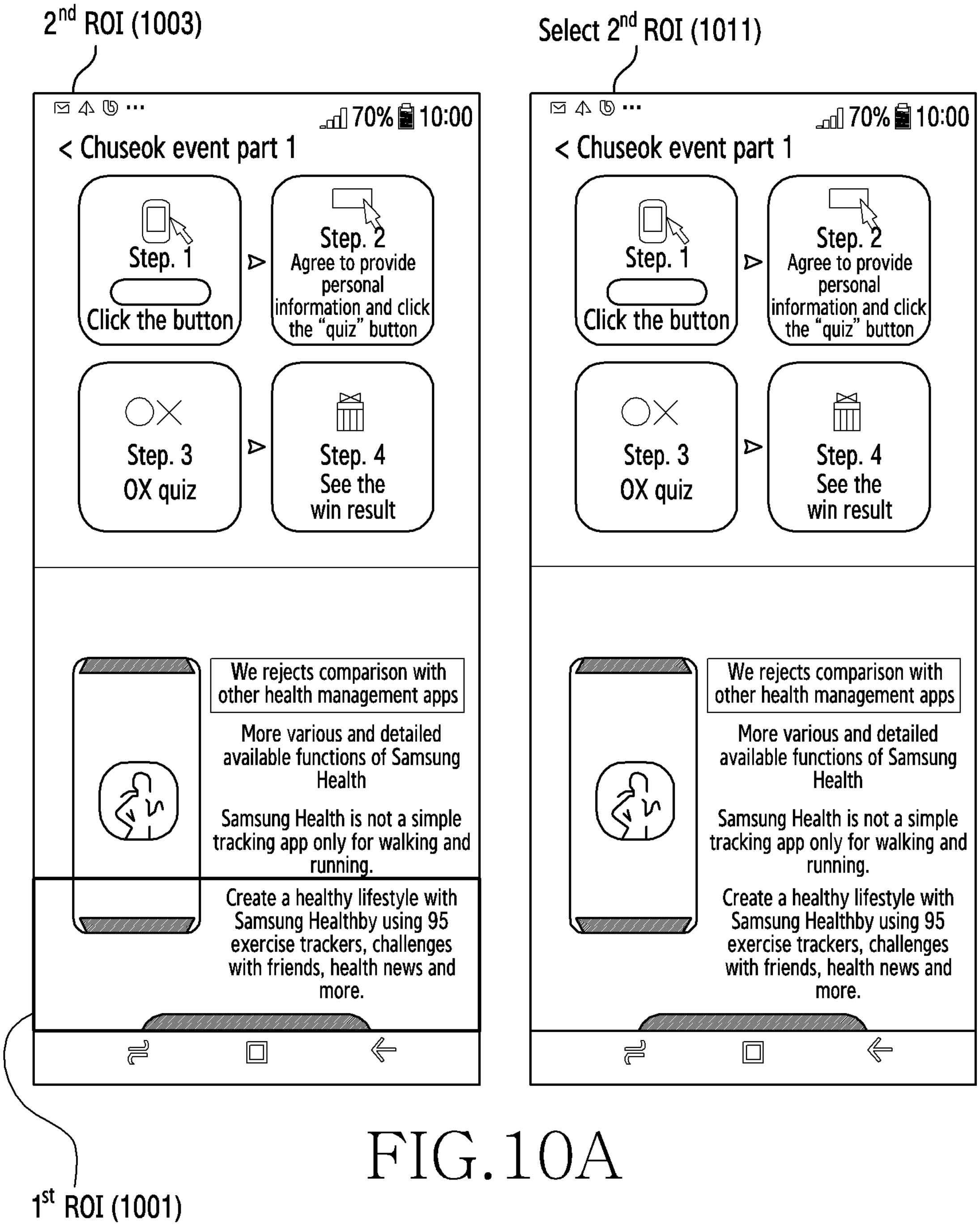
FIGS. 10A and 10B illustrate multiple regions of interest to acquire brightness information by the electronic device 101 according to various embodiments.
Figure 10B:
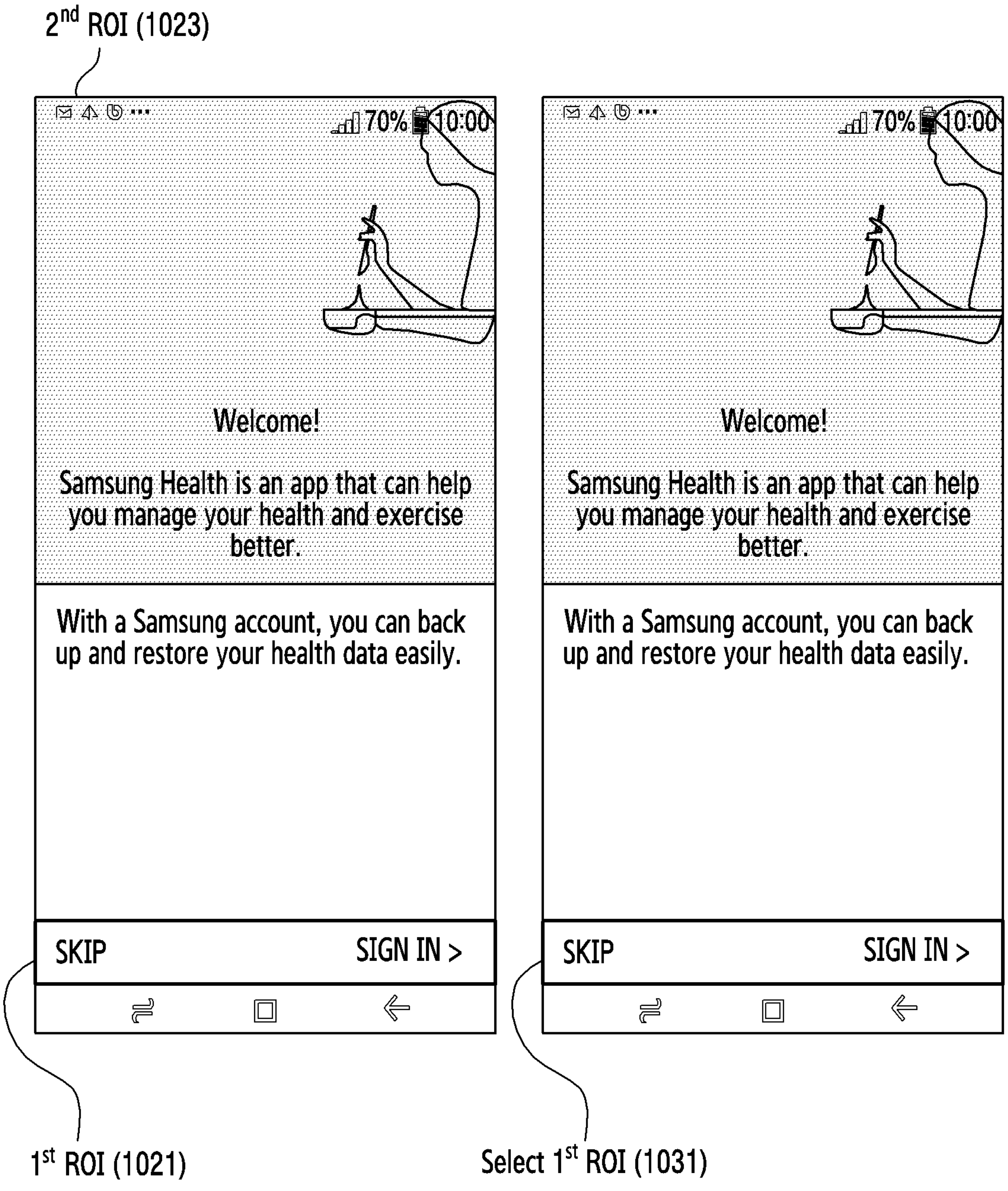
Figure 11A:
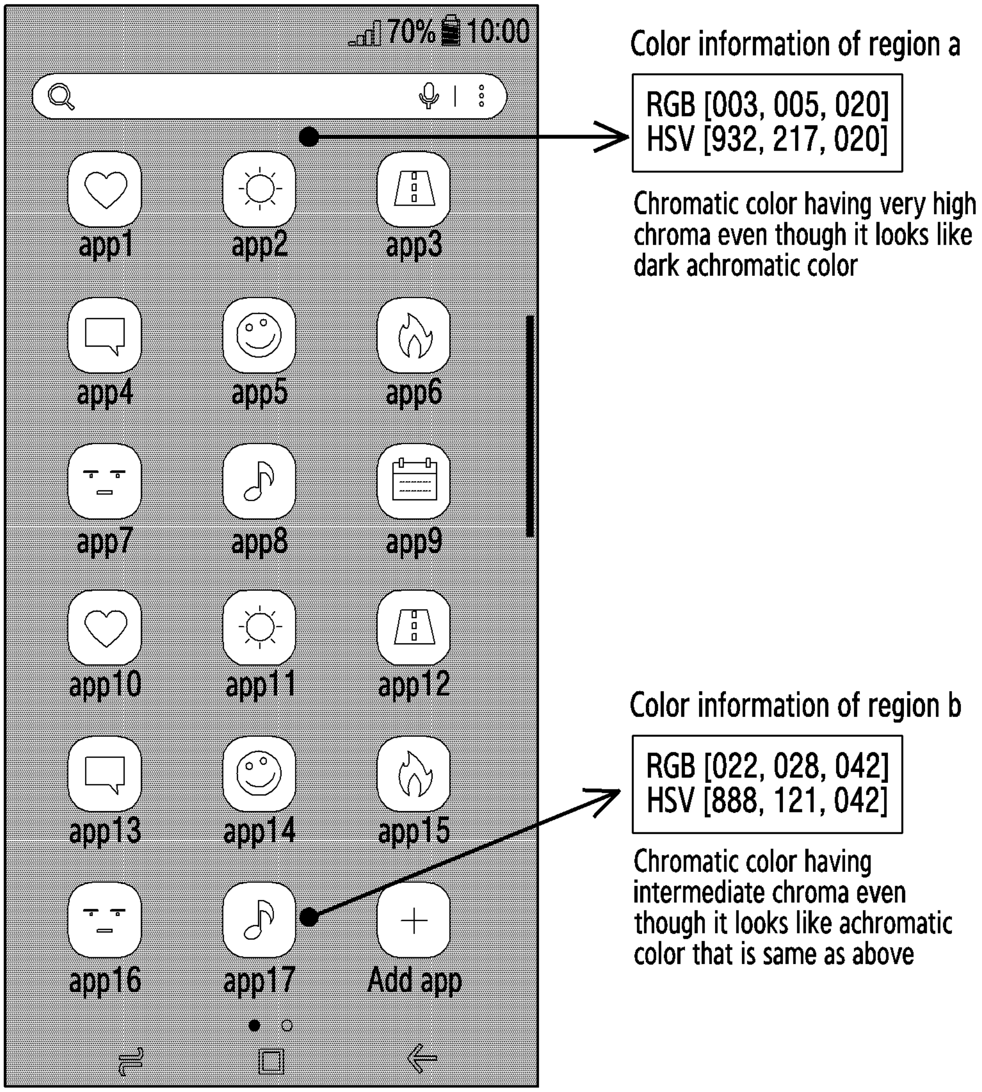
FIGS. 11A and 11B illustrate an example in which the electronic device 101 distinguishes between an achromatic color and a chromatic color according to various embodiments.
Figure 11B:
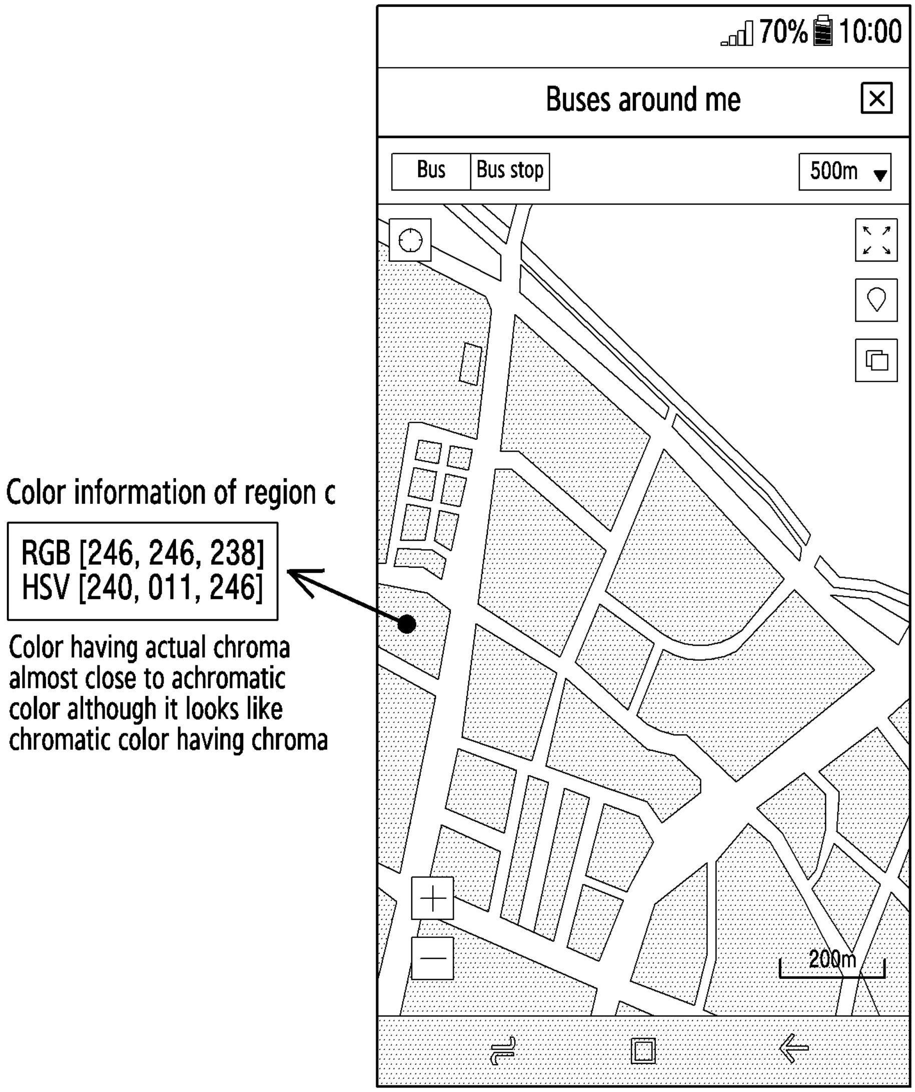

FIG. 8 is a flowchart illustrating a process in which the electronic device 101 acquires brightness information according to various embodiments. An operation of FIG. 8 described below may be at least the part of detailed description of operation 601 of FIG. 6. In the following embodiments, respective operations may be sequentially performed but the sequential performance is not necessary. For example, orders of the operations may be changed, and at least two operations may be performed in parallel. Hereinafter, an operation of an electronic device (for example, the processor 120 or the display driver IC 230) will be described with reference to FIGS. 9A, 9B, 10A, 10B, 11A, and 11B. FIGS. 9A and 9B illustrate a region of interest to acquire brightness information by the electronic device 101 according to various embodiments. FIGS. 10A and 10B illustrate multiple regions of interest to acquire brightness information by the electronic device 101 according to various embodiments. FIGS. 11A and 11B illustrate an example in which the electronic device 101 distinguishes between an achromatic color and a chromatic color according to various embodiments.

According to various embodiments, an electronic device (for example, the processor 120 or the display driver IC 230) may determine at least some regions of the first image layer as regions of interest in operation 801. According to an embodiment, the processor 120 or the display driver IC 230 of the electronic device may determine entire regions of the first image layer as regions of interest 901 and 903 as illustrated in FIG. 9A. In another example, the processor 120 or the display driver IC 230 of the electronic device may determine at least some regions of the entire regions of the first image layer adjacent to the second image layer as regions of interest 911 and 913 as illustrated in FIG. 9B. According to an embodiment, the processor 120 or the display driver IC 230 of the electronic device may determine regions of interest on the basis of a type of an application being executed, a characteristic of an application being executed, or user input. According to an embodiment, the processor 120 or the display driver IC 230 of the electronic device may configure a plurality of candidate regions of interest and determine one of the plurality of candidate regions of interest as a region of interest on the basis of display attribute information of content included in at least one candidate region of interest among the plurality of candidate regions of interest. For example, the processor 120 or the display driver IC 230 of the electronic device may configure some regions of the entire regions of the first image layer adjacent to the second image layer as first candidate regions of interest 1001 and 1021 and configure the entire regions of the first image layer as second regions of interest 1003 and 1023 as illustrated in FIGS. 10A and 10B. The processor 120 or the display driver IC 230 of the electronic device may acquire color information of content included in the first candidate regions of interest 1001 and 1021 and determine a region of interest on the basis of whether the first candidate regions of interest 1001 and 1021 are configured with a single color based on the acquired color information. When the first candidate region of interest 1001 is configured with two or more colors rather than a single color as illustrated in FIG. 10A, the processor 120 or the display driver IC 230 of the electronic device may select the second candidate region of interest 1003 as the region of interest as indicated by reference numeral 1011. When the first candidate region of interest 1021 is configured with a single color as illustrated in FIG. 10B, the processor 120 or the display driver IC 230 of the electronic device may select the first candidate region of interest 1021 as the region of interest as indicated by reference numeral 1031.

According to various embodiments, the electronic device (for example, the processor 120 or the display driver IC 230) may divide color information of the region of interest into achromatic color information and chromatic color information in operation 803. For example, the processor 120 or the display driver IC 230 of the electronic device may acquire color information from at least some contents corresponding to the region of interest among at least one first content included in the first image layer and divide the acquired color information into achromatic color information and chromatic color information. The processor 120 or the display driver IC 230 of the electronic device may distinguish between achromatic color information and chromatic color information on the basis of brightness information and chroma information included in the color information. For example, the processor 120 or the display driver IC 230 of the electronic device may divide the color information of the region of interest into achromatic color information and chromatic color information on the basis of reference values for the brightness and chroma shown in [Table 1]. Distinguishing between achromatic color information and chromatic color information on the basis of brightness information and chroma information is to consider a visual aspect of the user. For example, although a chroma value of region a may be 217 corresponding to a chromatic color and a chroma value of region b may be 121 corresponding to an achromatic color as illustrated in FIG. 11A, region a and region b may be equally considered as an achromatic color in a visual aspect of the user. In another example, although a chroma value of region c may be 008 corresponding to an achromatic color as illustrated in FIG. 11B, region c may be considered as a chromatic color in a visual aspect of the user. In consideration of the visual aspect of the user, the processor 120 or the display driver IC 230 of the electronic device according to various embodiments of the disclosure may distinguish between achromatic color information and chromatic color information on the basis of both the brightness value and the chroma value.

According to various embodiments, the electronic device (for example, the processor 120 or the display driver IC 230) may acquire first information related to brightness of the first image layer on the basis of achromatic color information in operation 805. For example, the processor 120 or the display driver IC 230 of the electronic device may acquire brightness values from information divided as achromatic color information in the color information of the region of interest and acquire first information on the basis of the acquired brightness values. The first information may include a representative brightness value or an average brightness value of the acquired brightness values.

Figure 12:
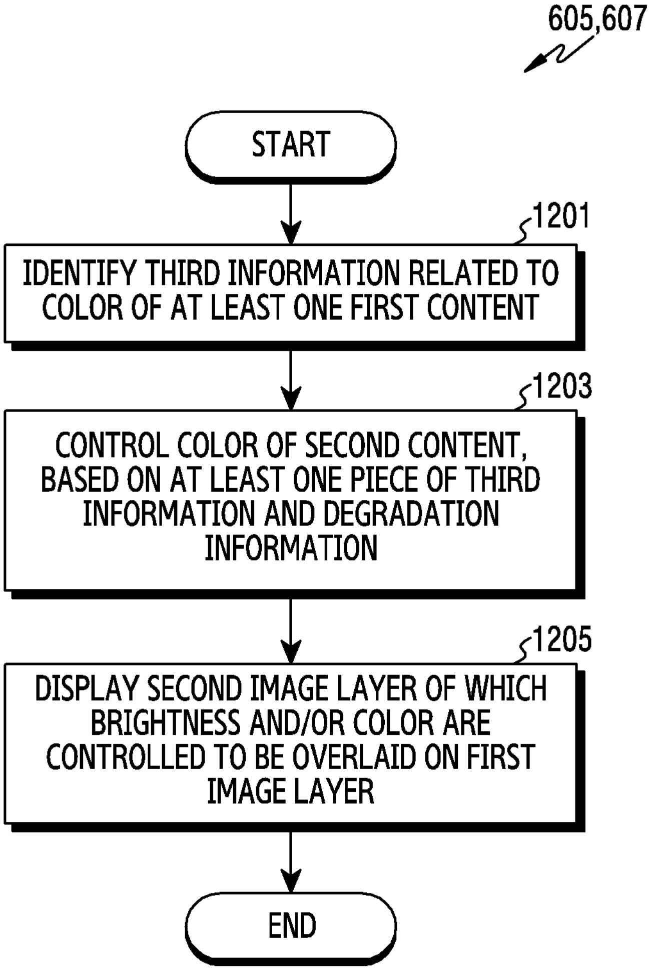
FIG. 12 is a flowchart illustrating a process in which the electronic device 101 controls at least one of display brightness and color according to various embodiments.
Figure 13:
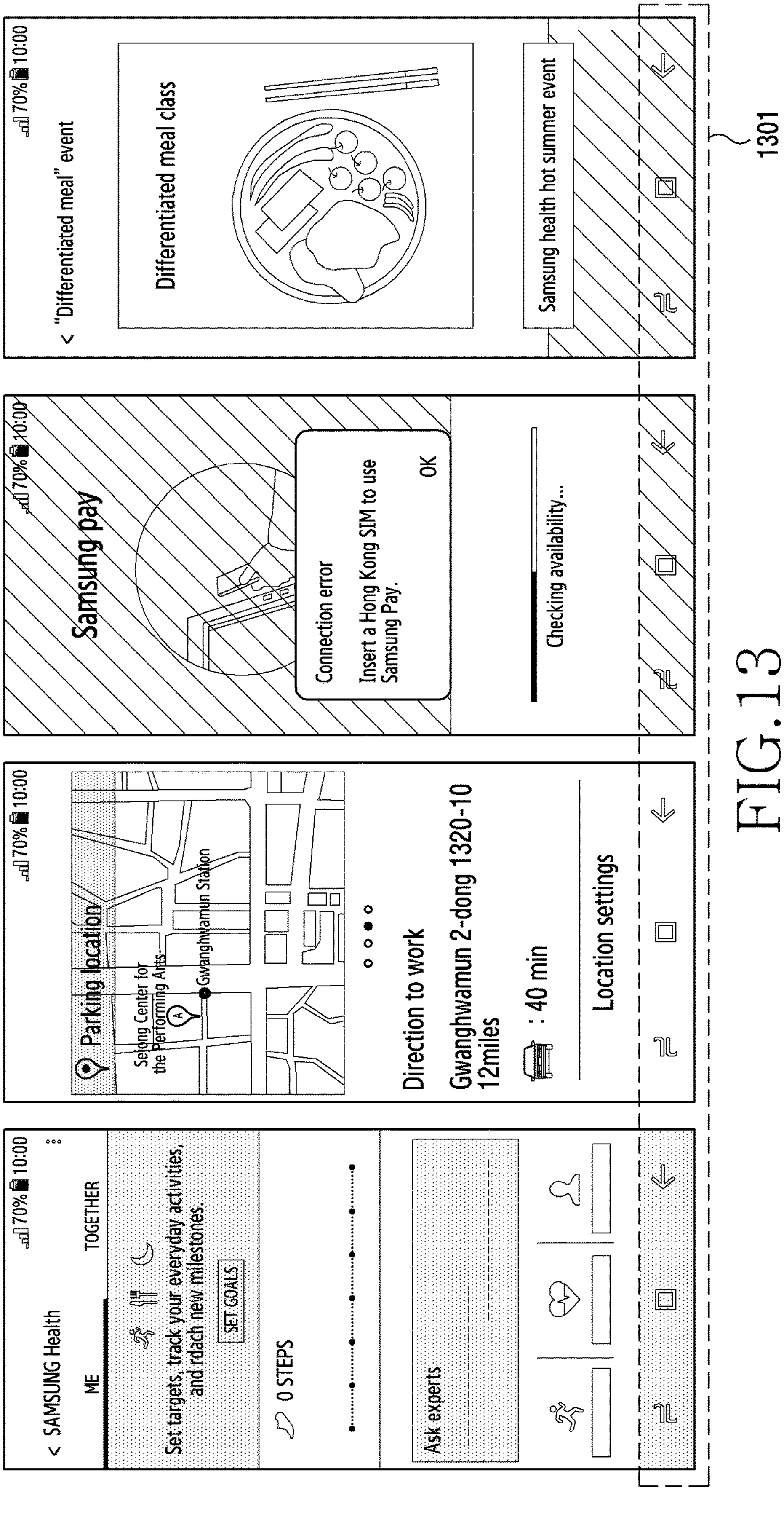
FIG. 13 illustrates an example in which the electronic device 101 controls at least one of brightness and a color according to various embodiments.

FIG. 12 is a flowchart illustrating a process in which the electronic device 101 controls at least one of display brightness and color according to various embodiments. An operation in FIG. 12 described below may be at least the part of detailed description of operations 605 and 607 of FIG. 6. In the following embodiments, respective operations may be sequentially performed but the sequential performance is not necessary. For example, orders of the operations may be changed, and at least two operations may be performed in parallel. Hereinafter, the electronic device (for example, the processor 120 of FIG. 1 or the display driver IC 230 of FIG. 2) will be described with reference to FIG. 13. FIG. 13 illustrates an example in which the electronic device 101 controls at least one of brightness and a color according to various embodiments.

According to various embodiments, the electronic device (for example, the processor 120 or the display driver IC 230) may identify third information related to a color of at least one first content included in the first image layer in operation 1201. For example, the processor 120 or the display driver IC 230 of the electronic device may identify third information (or first color information) related to the color of at least one first content included in the first image layer through the display 210. The third information related to the color of at least one first content may be determined on the basis of color values corresponding to at least one first content included in the first image layer. For example, the processor 120 or the display driver IC 230 of the electronic device may acquire a representative color value of the color values corresponding to at least one first content included in the first image layer and determine the acquired representative color value as third information. The representative color value may include a color value selected by a preset scheme among the color values corresponding to at least one first content. According to an embodiment, the processor 120 or the display driver IC 230 of the electronic device may acquire color values from the configured region of interest or chromatic color information within the region of interest as described with reference to FIG. 8 and acquire third information related to the color of first content on the basis of the acquired color values.

According to various embodiments, the electronic device (for example, the processor 120 or the display driver IC 230) may control the color of second content on the basis of at least one piece of the third information and display degradation information related to the second image layer in operation 1203. For example, the processor 120 or the display driver IC 230 of the electronic device may control the color of at least one second content included in the second image layer on the basis of the third information related to the color of at least one first content included in the first image layer. According to an embodiment, the processor 120 or the display driver IC 230 of the electronic device may additionally acquire fourth information related to the color of at least one second content included in the second image content. The processor 120 or the display driver IC 230 of the electronic device may determine whether to control the color of second content on the basis of a difference between the third information and the fourth information and a predetermined condition (for example, a predetermined third condition, a predetermined fourth condition, or a preset second reference range). For example, when the difference between the third information and the fourth information satisfies the predetermined third condition (for example, larger than the second reference range), the processor 120 or the display driver IC 230 of the electronic device may control the color of second content on the basis of the third information. In another example, when the difference between the third information and the fourth information satisfies a fourth condition (or does not satisfy the predetermined third condition) (for example, smaller than the second reference range), the processor 120 or the display driver IC 230 of the electronic device may maintain the color of the second content. According to an embodiment, the processor 120 or the display driver IC 230 of the electronic device may control the color value of the second content to have a color value corresponding to the third information. For example, the processor 120 or the display driver IC 230 of the electronic device may control the color of at least one second content such that at least some of the at least one second content is the same as the representative color value acquired from at least one first content included in the first image layer. According to an embodiment, the processor 120 or the display driver IC 230 of the electronic device may control the color of at least one second content included in the second image layer on the basis of the third information related to the color of at least one first content included in the first image layer and the display degradation information related to the second image layer. For example, the processor 120 or the display driver IC 230 of the electronic device may determine a second content display color and change or maintain the second content display color on the basis of the display degradation information related to the second image layer. In another example, the processor 120 or the display driver IC 230 of the electronic device may determine a second content display color on the basis of the difference between the third information and the fourth information and change or maintain the second content display color on the basis of the display degradation information related to the second image layer. The processor 120 or the display driver IC 230 of the electronic device may control the color of the second content on the basis of the changed or maintained second content display color.

According to various embodiments, the electronic device (for example, the processor 120 or the display driver IC 230) may control the display 210 such that the second image layer including the second content of which the brightness and/or the color are controlled is overlaid on the first image layer in operation 1205. For example, the processor 120 or the display driver IC 230 of the electronic device may control the display 210 to display at least one first content and the second content of which the brightness and/or the color are controlled in the state in which the second image layer is overlaid on the first image layer. For example, the processor 120 or the display driver IC 230 of the electronic device may control the display 210 such that a second image layer 1301 of which the brightness and/or the color are controlled to be similar to the representative brightness and/or the representative color of the first image is displayed on the first image layer as illustrated in FIG. 13. Displaying the second image layer to be overlaid on the first image layer is only an example, and various embodiments of the disclosure are not limited thereto. The brightness of the second content may be controlled in operation 605 of FIG. 6.

Figure 14:
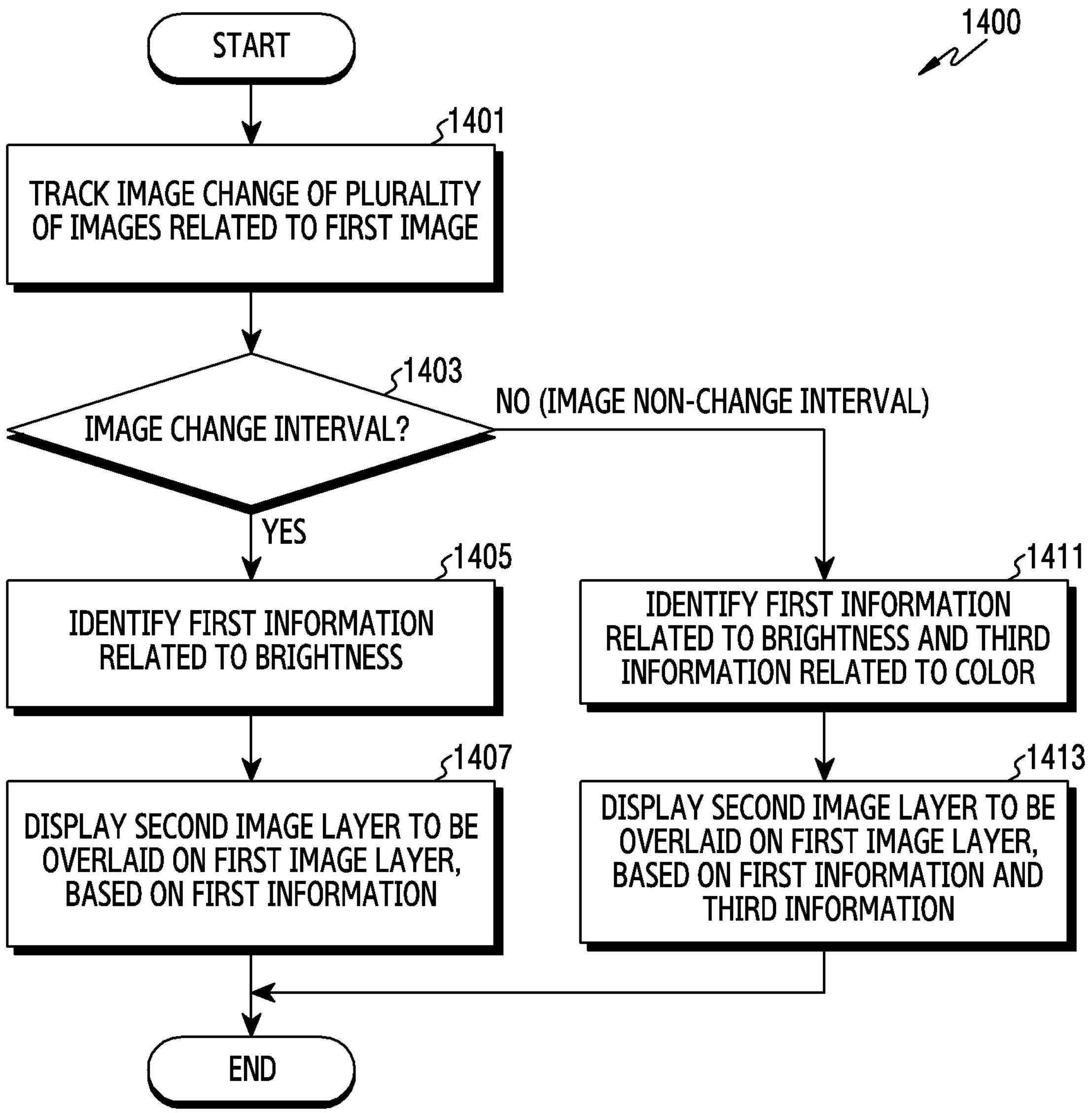
FIG. 14 is a flowchart illustrating a process in which the electronic device 101 controls a display attribute on the basis of an image change according to various embodiments.
Figure 15:
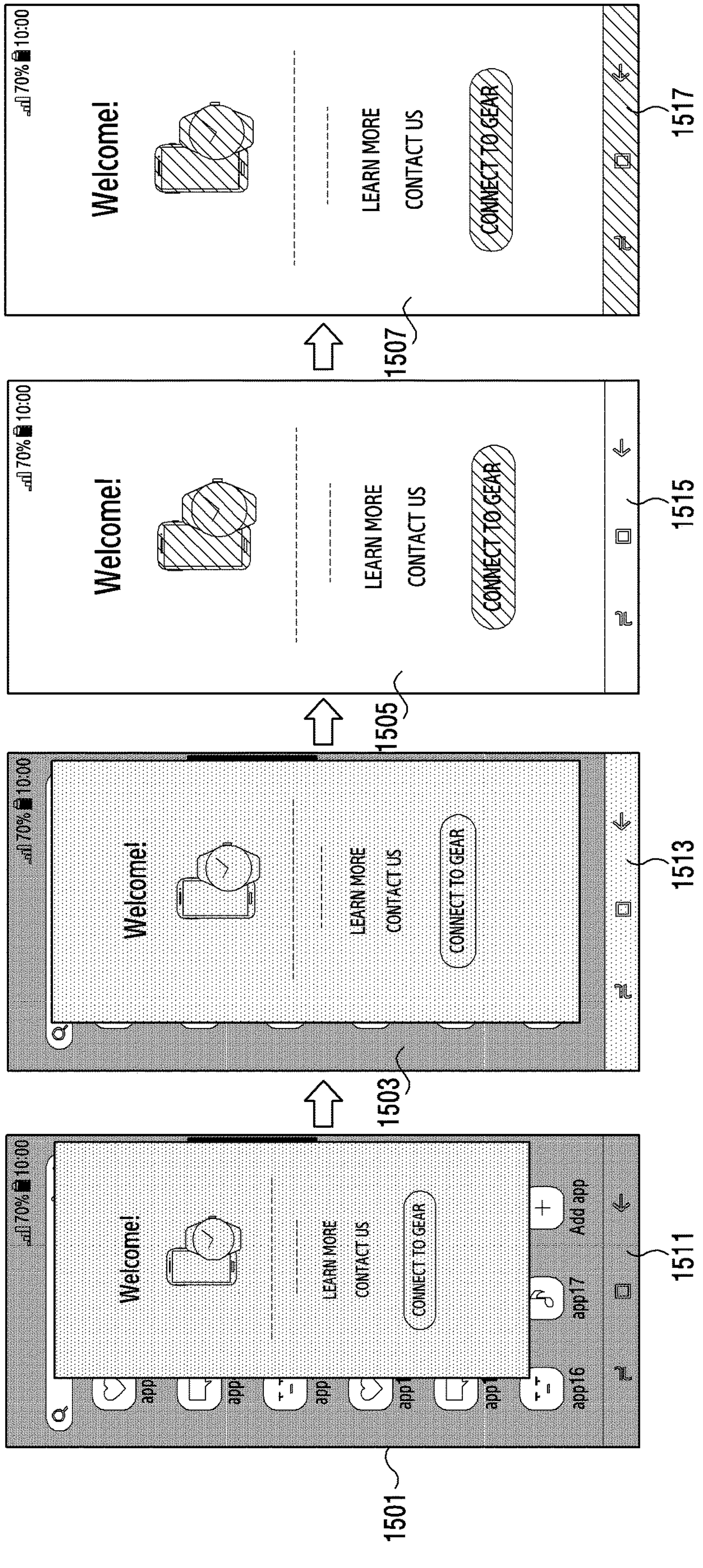
FIG. 15 illustrates an example in which the electronic device 101 controls a display attribute according to an image change according to various embodiments.

FIG. 14 is a flowchart 1400 illustrating a process in which the electronic device 101 controls a display attribute on the basis of an image change. In the following embodiments, respective operations may be sequentially performed but the sequential performance is not necessary. For example, orders of the operations may be changed, and at least two operations may be performed in parallel. Hereinafter, an operation of an electronic device (for example, the processor 120 of FIG. 1 or the display driver IC 230 of FIG. 2) will be described with reference to FIG. 15. FIG. 15 illustrates an example in which the electronic device 101 controls a display attribute according to an image change according to various embodiments.

According to various embodiments, the electronic device (for example, the processor 120 or the display driver IC 230) may track an image change of a plurality of successive images related to the first image in operation 1401. For example, the processor 120 or the display driver IC 230 of the electronic device may acquire a plurality of successive images to be displayed through the first image and track whether an image change within a predetermined range is made on the basis of at least one first content included in the plurality of successive images.

According to various embodiments, the electronic device (for example, the processor 120 or the display driver IC 230) may determine whether an image included in the first image layer to be displayed is an image corresponding to an image change interval in operation 1403. According to an embodiment, the processor 120 or the display driver IC 230 of the electronic device may determine whether the image to be displayed through the first image layer is an image corresponding to an image change interval or an image corresponding to an image non-change interval on the basis of the image tracking result. For example, when N (for example, 5) or more successive images have no image change detected, the processor 120 or the display driver IC 230 of the electronic device may determine the corresponding images as images corresponding to the image non-change interval. In another example, when an image change of N (for example, 5) or more successive images is equal to or smaller than a threshold change, the processor 120 or the display driver IC 230 of the electronic device may determine the corresponding images as images corresponding to the image non-change interval. In another example, when an image change of N (for example, 5) or more successive images is larger than a threshold change, the processor 120 or the display driver IC 230 of the electronic device may determine the corresponding images as images corresponding to the image change interval.

According to various embodiments, when the image included in the first image layer to be displayed corresponds to the image change interval, the electronic device (for example, the processor 120 or the display driver IC 230) may identify first information related to brightness from the image to be displayed through the first image layer in operation 1405. For example, the processor 120 or the display driver IC 230 of the electronic device may identify first information through the same scheme illustrated in operation 601 of FIG. 6.

According to various embodiments, the electronic device (for example, the processor 120 or the display driver IC 230) may control the second image layer of which the brightness is controlled to be overlaid on the first image layer in operation 1407. For example, the processor 120 or the display driver IC 230 of the electronic device may control brightness of the second image layer through the same scheme described in operations 605 and 607 of FIG. 6 and display the second image layer of which the brightness is controlled to be overlaid on the first image layer. For example, the processor 120 or the display driver IC 230 of the electronic device may perform control change only brightness of second image layers 1511, 1513, and 1515 on the basis of first information related to brightness of first image layers 1501, 1503, and 1505 during an interval in which an image displayed through the first image layers 1501, 1503, and 1505 is changed as illustrated in first to third screen configurations of FIG. 15.

According to various embodiments, when the image included in the first image layer to be displayed corresponds to the image non-change interval, the electronic device (for example, the processor 120 or the display driver IC 230) may identify the first information related to the brightness and the third information related to the first color from the image to be displayed through the first image layer in operation 1411. For example, the processor 120 or the display driver IC 230 of the electronic device may identify the first information through the same scheme described in operation 601 of FIG. 6 and identify the third information through the same scheme described in operation 1201 of FIG. 12.

According to various embodiments, the electronic device (for example, the processor 120 or the display driver IC 230) may control the second image layer of which the brightness and the color are controlled on the basis of the first information and the third information to be overlaid on the first image layer in operation 1413. For example, the processor 120 or the display driver IC 230 of the electronic device may control the brightness and the color of the second image layer through the same scheme described in operation 605 of FIG. 6 and operation 1203 of FIG. 12 and display the second image layer of which the brightness and the color are controlled to be overlaid on the first image layer. For example, the processor 120 or the display driver IC 230 of the electronic device may perform control to change the brightness and the color of the second image layer 1517 on the basis of the first information related to the brightness of the first image layer 1507 and the third information related to the color of the first image layer 1507 during an interval in which the image displayed through the first image layer 1507 is not changed as illustrated in a fourth screen configuration of FIG. 15.

In the above description, the reason to change only the brightness of the second image layer during the interval in which the image displayed through the first image layer is changed and changing both the brightness and the color of the second image layer during the interval in which the image displayed through the first image layer is not changed is a time spent for acquiring brightness information is shorter than a time spent for acquiring color information.

Figure 16:
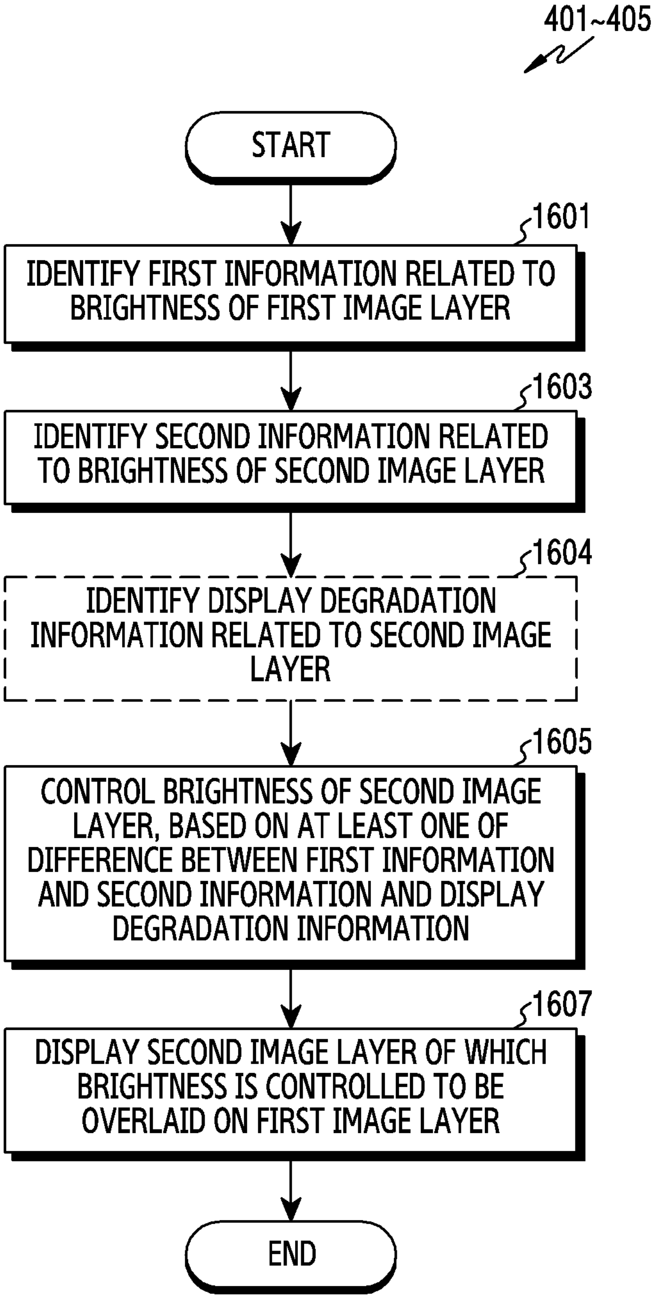
FIG. 16 is a flowchart illustrating a process in which the electronic device 101 controls a display attribute according to various embodiments.

FIG. 16 is a flowchart illustrating a process in which the electronic device 101 controls a display attribute according to various embodiments. An operation of FIG. 16 described below may be at least the part of detailed description of operation 401 to 405 of FIG. 4. In the following embodiments, respective operations may be sequentially performed but the sequential performance is not necessary. For example, orders of the operations may be changed, and at least two operations may be performed in parallel. Hereinafter, an operation expressed by dotted lines may be omitted according to an embodiment.

According to various embodiments, an electronic device (for example, the processor 120 of FIG. 1 or the display driver IC 230 of FIG. 2) may identify first information related to brightness of the first image layer in operation 1601. For example, the processor 210 or the display driver IC 230 of the electronic device may identify first information related to brightness of the first image layer to be displayed on the display 210. The first information related to brightness of the first image layer may be determined on the basis of brightness values corresponding to at least one first content included in the first image layer. For example, the processor 210 or the display driver IC 230 of the electronic device may identify first information as described in operation 601 of FIG. 6. According to an embodiment, operation 1601 may include the operations described in FIG. 8.

According to various embodiments, the electronic device (for example, the processor 120 or the display driver IC 230) may identify second information related to brightness of the second image layer in operation 1603. For example, the processor 210 or the display driver IC 230 of the electronic device may identify second information related to brightness of the second image layer to be displayed on the display 210. The second information related to brightness of the second image layer may be determined on the basis of brightness values corresponding to at least one second content included in the second image layer. For example, the processor 210 or the display driver IC 230 of the electronic device may identify second information as described in operation 603 of FIG. 6.

According to various embodiments, the electronic device (for example, the processor 120 or the display driver IC 230) may identify display degradation information related to the second image layer in operation 1604. For example, the processor 210 or the display driver IC 230 of the electronic device may identify display degradation information related to the second image layer as described in operation 604 of FIG. 6. According to various embodiments, the electronic device (for example, the processor 120 or the display driver IC 230) may control brightness of the second image layer on the basis of at least one of a difference between the first information and the second information or the display degradation information in operation 1605. According to an embodiment, the processor 210 or the display driver IC 230 of the electronic device may determine whether to control brightness of the second image layer on the basis of the difference between the first information and the second information and a predetermined condition (for example, a predetermined first condition, a predetermined second condition, or a predetermined first reference range). For example, when the difference between the first information and the second information satisfies the predetermined first condition (for example, larger than a reference range), the processor 210 or the display driver IC 230 of the electronic device may control brightness of the second image layer on the basis of the difference between the first information and the second information. In another example, when the difference between the first information and the second information satisfies the predetermined second condition (or does not satisfy the predetermined first condition) (for example, smaller than the reference range), the processor 210 or the display driver IC 230 of the electronic device may maintain brightness of the second image layer. According to an embodiment, the processor 210 or the display driver IC 230 of the electronic device may control the brightness such that the brightness of the second image layer is changed by the difference between the first information and the second information. According to an embodiment, the processor 210 or the display driver IC 230 of the electronic device may perform control to change the brightness value of the second image layer from the second information to the first information. According to an embodiment, the processor 210 or the display driver IC 230 of the electronic device may control the brightness of the second image layer on the basis of the difference between the first information and the second information and the display degradation information related to the second image layer. According to an embodiment, the electronic device (for example, the processor 120 or the display driver IC 230) may control a color the second image layer on the basis of a color of the first image layer by additionally performing the operations of FIG. 12.

According to various embodiments, the electronic device (for example, the processor 120 or the display driver IC 230) may control the display 210 to display the second image layer of which the brightness is controlled to be overlaid on the first image layer in operation 1607. For example, the processor 210 or the display driver IC 230 of the electronic device may control the display 210 to display at least one first content and second content in the state in which the image layer of which second brightness is controlled is overlaid on the first image layer. According to various embodiments, the electronic device (for example, the processor 120 or the display driver IC 230) may control the display 210 such that the second image layer of which the brightness and the color are controlled is overlaid of the first image layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:

a display; and a processor, wherein the processor is configured to identify first information related to a brightness of at least one first content included in a first image layer to be displayed on the display and second information related to a brightness of at least one second content included in a second image layer to be displayed on the display, control the brightness of the second image layer, based on at least a difference between the first information and the second information, and display the at least one first content and the at least one second content of which the brightness is controlled on the display in a state in which the second image layer is overlaid on the first image layer including the at least one first content, and wherein the processor is further configured to configure at least one region of interest for the first image layer, acquire brightness information from at least a part of the at least one region of interest in the at least one first content included in the first image layer, and identify the first information based on the acquired brightness information, wherein the at least one region of interest includes at least some of a first region corresponding to an entire region of the first image layer or a second region corresponding to at least some of the entire region of the first image layer adjacent to the second image layer.

2. The electronic device of claim 1, wherein the processor is configured to control the brightness of the at least one second content when the difference between the first information and the second information satisfies a predetermined first condition and maintain the brightness of the at least one second content when the difference between the first information and the second information satisfies a predetermined second condition.

3. The electronic device of claim 1, wherein the processor is configured to identify third information related to a color of the at least one first content to be displayed on the display or degradation information of the display related to the second image layer and control the color of the at least one second content, based on the third information or the degradation information of the display related to the second image layer, and the color of the at least one second content is controlled based on at least a difference between the third information and fourth information related to the color of the at least one second content.

4. The electronic device of claim 3, wherein the processor is configured to control the color of the at least one second content when the difference between the third information and the fourth information satisfies a predetermined third condition and maintain the color of the at least one second content when the difference between the third information and the fourth information satisfies a predetermined fourth condition.

5. The electronic device of claim 3, wherein the processor is configured to re-control, based on the degradation information of the display related to the second image layer, the color of the at least one second content controlled based on at least the difference between the third information and the fourth information, and the degradation information of the display related to the second image layer includes a degradation level of at least one subpixel corresponding to a display region of the second image layer.

6. The electronic device of claim 1, wherein the processor is configured to acquire color information from at least a part corresponding to the at least one region of interest in the at least one first content included in the first image layer, identify third information related to a color of the at least one first content, based on the acquired color information, and control a color of the at least one second content, based on at least the third information.

7. The electronic device of claim 1, wherein the processor is configured to identify whether an image change of images displayed through the first image layer satisfies a first predetermined image change condition, based on the at least one first content, control at least one of the brightness or a color of the at least one second content while the image change of the images displayed through the first image layer satisfies the first predetermined image change condition, and control the brightness of the at least one second content while the image change of the images displayed through the first image layer satisfies a second predetermined image change condition.

8. The electronic device of claim 1, wherein the processor is configured to acquire achromatic color information from the at least one first content and determine the first information, based on the achromatic color information, and the achromatic color information is acquired based on at least one of a brightness reference value or a chroma reference value.

9. The electronic device of claim 8, wherein the processor is configured to acquire chromatic color information from the at least one first content, determine third information related to a color of the at least one first content, based on the chromatic color information, and control a color of the at least one second content, based on the third information.

10. An electronic device comprising:

a display; and a processor, wherein the processor is configured to determine first display attribute information related to a first image layer including at least one first content to be displayed on the display, determine second display attribute information related to a second image layer including at least one at least one second content to be displayed on the display, based on the first display attribute information, and display the first image layer and the second image layer based on the determined second display attribute information on the display, and the first display attribute information includes brightness information or color information related to the first image layer and the second display attribute information includes brightness information or color information to be used for displaying the second image layer, and wherein the processor is further configured to configure at least one region of interest for the first image layer, acquire brightness information from at least a part of the at least one region of interest in the at least one first content included in the first image layer, and determine the first display attribute information based on the acquired brightness information, wherein the at least one region of interest includes at least some of a first region corresponding to an entire region of the first image layer or a second region corresponding to at least some of the entire region of the first image layer adjacent to the second image layer.

* * * * *